(12) United States Patent
Dorfinger et al.

(10) Patent No.: US 12,269,226 B2
(45) Date of Patent: Apr. 8, 2025

(54) METHODS FOR SELECTIVE POST-CURING OF ADDITIVELY MANUFACTURED OBJECTS

(71) Applicant: Align Technology, Inc., San Jose, CA (US)

(72) Inventors: Peter Dorfinger, Woodside, CA (US); Michael Christopher Cole, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 18/449,593

(22) Filed: Aug. 14, 2023

(65) Prior Publication Data

US 2024/0051246 A1 Feb. 15, 2024

Related U.S. Application Data

(60) Provisional application No. 63/371,435, filed on Aug. 15, 2022.

(51) Int. Cl.
*B29C 64/386* (2017.01)
*A61C 13/14* (2006.01)
(Continued)

(52) U.S. Cl.
CPC .............. *B29C 71/04* (2013.01); *A61C 13/14* (2013.01); *A61C 19/003* (2013.01);
(Continued)

(58) Field of Classification Search
CPC ... B29C 64/264; B29C 71/04; B29C 71/0009; B29C 64/393; B29C 64/386;
(Continued)

(56) References Cited

U.S. PATENT DOCUMENTS 6,210,162 B1 4/2001 Chishti et al.
6,309,215 B1 10/2001 Phan et al.
(Continued)

FOREIGN PATENT DOCUMENTS

CN 110202784 A 9/2019
CN 110183701 B 3/2020
(Continued)

OTHER PUBLICATIONS

Bastmeyer, et al. "Movable Microstructures From the Printer," KIT—The Research University in the Helmholtz Association, 2019, pp. 1-3.
(Continued)

*Primary Examiner* — Monica A Huson
*Assistant Examiner* — Kelsey C Grace
(74) *Attorney, Agent, or Firm* — FORTEM IP LLP

(57) ABSTRACT

Methods for manufacturing objects are provided herein. In some embodiments, a method includes receiving a dental appliance formed using an additive manufacturing process, the dental appliance including a plurality of appliance portions. The method can include identifying, based on sensor data, a location of a subset of the appliance portions on the dental appliance. The method can further include applying energy to a subset of the appliance portions to selectively modify one or more material properties of the subset of the appliance portions.

20 Claims, 14 Drawing Sheets

(51) Int. Cl.
*A61C 13/15* (2006.01)
*B29C 64/264* (2017.01)
*B29C 71/04* (2006.01)
*B29L 31/00* (2006.01)
*B33Y 10/00* (2015.01)
*B33Y 40/20* (2020.01)
*B33Y 50/00* (2015.01)
*B33Y 80/00* (2015.01)

(52) U.S. Cl.
CPC .......... *B29C 64/264* (2017.08); *B29C 64/386* (2017.08); *B29L 2031/7536* (2013.01); *B33Y 10/00* (2014.12); *B33Y 40/20* (2020.01); *B33Y 50/00* (2014.12); *B33Y 80/00* (2014.12)

(58) Field of Classification Search
CPC ... B29C 64/124; B29C 35/0805; B29C 71/02; B29C 64/35; B29C 64/10; B29C 35/0266; B29C 2071/0027; A61C 19/003; A61C 13/14; A61C 7/08; B33Y 70/00; B33Y 50/00; B33Y 10/00; B33Y 80/00; B33Y 40/20; B29L 2031/7536
See application file for complete search history.

(56) References Cited

U.S. PATENT DOCUMENTS

| | | | |
|---|---|---|---|
| 6,450,807 B1 | 9/2002 | Chishti et al. |
| 6,497,574 B1 | 12/2002 | Miller |
| 6,749,414 B1 | 6/2004 | Hanson et al. |
| 6,830,450 B2 | 12/2004 | Knopp et al. |
| 6,957,118 B2 | 10/2005 | Kopelman et al. |
| 6,976,627 B1 | 12/2005 | Culp et al. |
| 7,092,784 B1 | 8/2006 | Simkins |
| 7,192,273 B2 | 3/2007 | McSurdy, Jr. |
| 7,220,124 B2 | 5/2007 | Taub et al. |
| 7,236,842 B2 | 6/2007 | Kopelman et al. |
| 7,245,977 B1 | 7/2007 | Simkins |
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,892,474 B2 | 2/2011 | Shkolnik et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,630,249 B2 | 4/2017 | Toyserkani et al. |
| 9,700,385 B2 | 7/2017 | Webber |
| 9,844,424 B2 | 12/2017 | Wu et al. |
| 9,943,386 B2 | 4/2018 | Webber et al. |
| 9,943,991 B2 | 4/2018 | Tanugula et al. |
| 9,999,509 B2 | 6/2018 | Dikovsky et al. |
| 10,065,371 B2 | 9/2018 | Martin |
| 10,162,264 B2 | 12/2018 | McLeod et al. |
| 10,336,102 B2 | 7/2019 | Cole |
| 10,354,445 B2 | 7/2019 | Greene et al. |
| 10,495,973 B2 | 12/2019 | Cole |
| 10,783,629 B2 | 9/2020 | Parpara et al. |
| 10,888,395 B2 | 1/2021 | Kopelman |
| 10,912,629 B2 | 2/2021 | Tanugula et al. |
| 10,993,783 B2 | 5/2021 | Wu et al. |
| 11,045,283 B2 | 6/2021 | Riley et al. |
| 11,103,330 B2 | 8/2021 | Webber et al. |
| 11,189,021 B2 | 11/2021 | Shah et al. |
| 11,273,011 B2 | 3/2022 | Shanjani et al. |
| 11,295,444 B2 | 4/2022 | Cherkas et al. |
| 11,312,067 B2 | 4/2022 | Saha et al. |
| 11,318,667 B2 | 5/2022 | Mojdeh et al. |
| 11,370,173 B2 | 6/2022 | Kelly et al. |
| 11,420,362 B2 | 8/2022 | Mojdeh et al. |
| 11,511,485 B2 | 11/2022 | Mojdeh et al. |
| 11,534,277 B2 | 12/2022 | Chavez et al. |
| 11,554,000 B2 | 1/2023 | Webber |
| 11,564,777 B2 | 1/2023 | Kopelman et al. |
| 11,602,413 B2 | 3/2023 | Chen et al. |
| 11,666,415 B2 | 6/2023 | Wang et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Liu et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2009/0148814 A1 | 6/2009 | Li et al. |
| 2014/0061974 A1 | 3/2014 | Tyler |
| 2014/0265034 A1 | 9/2014 | Dudley |
| 2015/0097315 A1 | 4/2015 | DeSimone et al. |
| 2017/0007361 A1 | 1/2017 | Boronkay et al. |
| 2017/0135793 A1 | 5/2017 | Webber et al. |
| 2017/0165032 A1 | 6/2017 | Webber et al. |
| 2019/0000593 A1 | 1/2019 | Cam et al. |
| 2019/0046297 A1 | 2/2019 | Kopelman et al. |
| 2019/0134886 A1* | 5/2019 | Willis .................. B29C 64/124 |
| 2019/0298494 A1 | 10/2019 | Webber et al. |
| 2019/0338067 A1 | 11/2019 | Liska et al. |
| 2020/0086553 A1* | 3/2020 | Mojdeh .................. A61C 7/10 |
| 2020/0290262 A1 | 9/2020 | Aguilar Mendez et al. |
| 2021/0030516 A1 | 2/2021 | O'Leary et al. |
| 2021/0095056 A1 | 4/2021 | Klun et al. |
| 2021/0113303 A1 | 4/2021 | Kopelman |
| 2021/0146619 A1 | 5/2021 | Shusteff et al. |
| 2021/0147672 A1 | 5/2021 | Cole et al. |
| 2021/0229364 A1 | 7/2021 | McLeod et al. |
| 2021/0259809 A1 | 8/2021 | O'Leary et al. |
| 2021/0369413 A1 | 12/2021 | Li et al. |
| 2021/0395420 A1 | 12/2021 | Frank et al. |
| 2022/0040915 A1 | 2/2022 | Rao et al. |
| 2022/0098350 A1 | 3/2022 | Cole et al. |
| 2022/0227051 A1 | 7/2022 | Regehly |
| 2022/0380502 A1 | 12/2022 | Choudhary et al. |
| 2023/0021953 A1 | 1/2023 | Choudhary et al. |

FOREIGN PATENT DOCUMENTS

| | | |
|---|---|---|
| CN | 111333790 A | 6/2020 |
| DE | 102021002361 A1 | 6/2021 |
| EP | 3860830 A1 | 8/2021 |
| EP | 3999312 A1 | 5/2022 |
| WO | 0114460 A1 | 3/2001 |
| WO | 2015075094 A1 | 5/2015 |
| WO | 2016078838 A1 | 5/2016 |
| WO | 2017115076 A1 | 7/2017 |
| WO | 2018032022 A1 | 2/2018 |
| WO | 2019226874 A1 | 11/2019 |
| WO | 2020245456 A1 | 12/2020 |
| WO | 2021037549 A1 | 3/2021 |

(56) References Cited

FOREIGN PATENT DOCUMENTS

| WO | 2021053579 A1 | 3/2021 |
| WO | 2021130657 A1 | 7/2021 |
| WO | 2021130661 A1 | 7/2021 |
| WO | 2021236907 A1 | 11/2021 |
| WO | 2022011456 A1 | 1/2022 |
| WO | 2022047394 A1 | 3/2022 |

OTHER PUBLICATIONS

Dillon, et al, "Processing and Modeling Optimization for Grayscale Lithography," Advances in Resist Materials and Processing Technology, 2008, vol. 6923, 13 pages.

Grushina, "Direct-Write Grayscale Lithography," Advanced Optical Technologies, 2019, vol. 8 (3-4), pp. 163-169.

Hamel, et al., "Machine-learning Based Design of Active Composite Structures for 4d Printing," Smart Materials and Structures, 2019, vol. 28, pp. 1-12.

Hamid, et al., "Three-dimensional Soft Material Micropatterning via Grayscale Photolithography for Improved Hydrophobicity of Polydimethylsiloxane (PDMS)," Micromachines, 2022, vol. 13 (1), 13 pages.

Kuang, et al., "Grayscale Digital Light Processing 3d Printing for Highly Functionally Graded Materials," Science Advance, 2019, vol. 5 (5), 10 pages.

Loomis, et al., "Grayscale lithography—automated mask generation for complex three-dimensional topography," Journal of Micro/Nanolithography, MEMS, and MOEMS, 2016, vol. 15 (1), 11 pages.

Luongo, et al., "Microstructure Control in 3D Printing with Digital Light Processing," Computer Graphics Forum, 2019, pp. 1-12.

Mori, et al., "Three-Dimensional Micro Capillaries Formed by Gray-Scale Lithography of Photosensitive Glass," 7th International Conference on Miniaturized Chemical and Blochemical Analysis Systems, 2003, pp. 203-206.

Mostafa, et al., "Tolerance Control Using Subvoxel Gray-Scale DLP 3D Printing," Advanced Manufacturing, 2017, vol. 2, pp. 1-7.

Muralidharan, et al., "Multi-material Grayscale Stereolithography of Gradient Composites With Deterministic Control Over Integration," In Consideration For The SME Dick Aubin Distinguished Paper Award, pp. 1-19.

Muralidharan, et al., "Stereolithographic 3D Printing for Deterministic Control Over Integration in Dual-Material Composites," Advanced Materials Technologies, 2019, 1900592, pp. 1-11.

Nohut, et al., "Vat Photopolymerization Additive Manufacturing of Functionally Graded Materials: A Review," Journal of Manufacturing and Materials Processing, 2022, vol. 6 (17), pp. 1-24.

Peng, et al., "3D Grayscale Lithography Based on Exposure Optimization," Advanced Patterning Solutions (IWAPS), International Workshop, 2021.

Peng, et al., "Multi-Color 3D Printing via Single-Vat Grayscale Digital Light Processing," Advanced Functional Materials, 2022, vol. 2112329, pp. 1-9.

Rammohan, et al., "One-step maskless grayscale lithography for the fabrication of 3-dimensional structures in SU-8," Sensors and Actuators B: Chemical, 2011, vol. 153 (1), pp. 125-134.

Rudzinski, et al., "Fabrication of 3-D PDMS nano-template for UV nano-imprint Lithography and Micro contact Printing by means of Grey Scale Electron Beam Lithography," International Workshop on Physics of Semiconductor Devices (IWPSD), 2007, pp. 1-3.

Ryckman, et al., "Three-dimensional patterning and morphological control of porous nanomaterials by gray-scale direct imprinting," Scientific Reports, 2013, vol. 1502, pp. 1-7.

Smith, et al., "Design, simulation, and fabrication of three-dimensional microsystem components using grayscale photolithography," Journal of Micro/Nanolithography, MEMS, and MOEMS, 2019, vol. 18 (4), pp. 1-14.

Sun, et al., "Machine Learning-evolutionary Algorithm Enabled Design for 4d-Printed Active Composite Structures," Advanced Functional Materials, 2022, vol. 32, pp. 1-13.

Valizadeh, "Parametric visco-hyperelastic constitutive modeling of functionally graded 3D printed polymers," International Journal of Mechanical Sciences, 2022, vol. 226, 9 pages.

Wang, et al., "Projection-Based Continuous 3D Printing Process With the Grayscale Display Method," Journal of Manufacturing Science and Engineering, 2020, vol. 142 (2).

Wu, "Constitutive Modeling of Photopolymerization and Its Application to 3D Printing," A Dissertation Presented to the Academic Faculty, 2018, 173 pages.

Wu, et al., "Reversible shape change structures by grayscale pattern 4D printing," Multifunctional Materials, 2018, 14 pages.

Zhang, et al., "Shape-Memory Balloon Structures by Pneumatic Multi-Material 4D Printing," Advanced Functional Materials, 2021, vol. 31, pp. 1-8.

Zhang, et al., "Rapid volatilization induced mechanically robust shape-morphing structures toward 4D printing," ACS Applied Materials and Interfaces, 2020, pp. 1-20.

* cited by examiner

METHODS FOR SELECTIVE POST-CURING OF ADDITIVELY MANUFACTURED OBJECTS

CROSS-REFERENCE TO RELATED APPLICATION(S)

The present application claims the benefit of and priority to U.S. Provisional Patent Application No. 63/371,435, filed Aug. 15, 2022, which is incorporated by reference herein in its entirety.

TECHNICAL FIELD

The present technology generally relates to manufacturing processes, and in particular, to methods for producing additively manufactured objects with heterogeneous properties.

BACKGROUND

Additive manufacturing encompasses a variety of technologies that involve building up three-dimensional objects from multiple layers of material. Typically, additively manufactured objects formed from a single type of material exhibit homogeneous properties throughout the entire object. However, in some applications, it may be desirable for the additively manufactured object to have heterogeneous properties, such that different portions of the object exhibit different properties. Conventional additive manufacturing techniques for producing objects with heterogeneous properties typically involve forming the object from multiple materials and/or using hybrid printing processes. However, such techniques generally require more complex equipment and specialized reagents, and may therefore be unsuitable for producing large numbers of additively manufactured objects in a time- and cost-efficient manner.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

Figure 1:
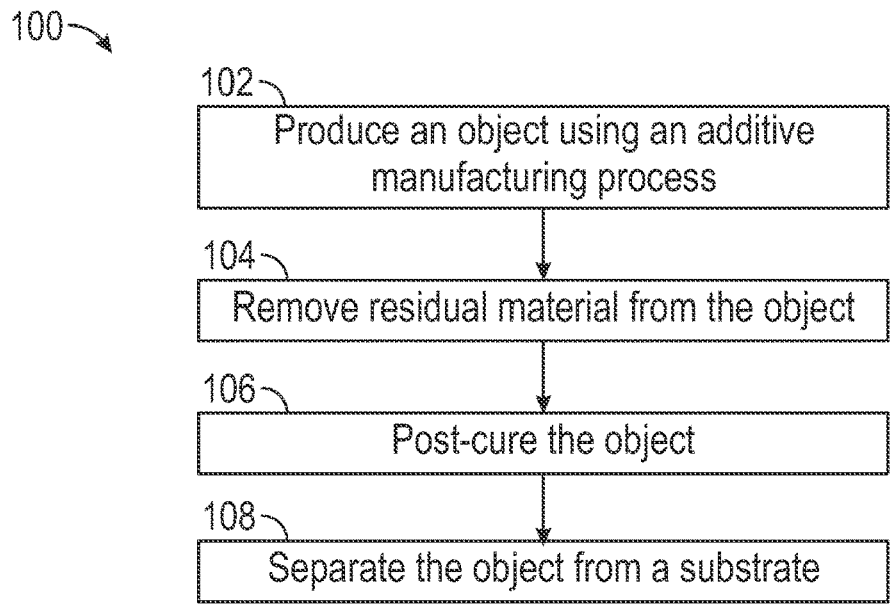
FIG. 1 is a flow diagram providing a general overview of a method for fabricating and post-processing an additively manufactured object, in accordance with embodiments of the present technology.

The present technology relates to methods for producing additively manufactured objects with heterogeneous properties. In some embodiments, for example, a method for producing an object includes receiving a digital data set representing the object, and applying energy to a curable material based on the digital data set to form the object. The object can include at least two object portions that are formed from the curable material using different energy application parameters. For example, a first object portion can be formed using a first energy intensity and/or dosage, and a second object portion can be formed using a second, different energy intensity and/or dosage. The different energy application parameters can be used to control the amount of residual curable material (e.g., residual monomers and/or oligomers) removed from each object portion in a subsequent material removal process (e.g., via solvent, heat, and/or vacuum). For instance, the different energy application parameters can selectively alter the local characteristics of each object portion, such as the degree of curing (e.g., degree of polymerization and/or the double bond conversion (DBC)) of the curable material within that object portion. The local characteristics of each object portion can affect the amount of residual curable material removed from the object portion (e.g., more material is removed from object portions having a lower degree of curing), which in turn can affect the local material properties of the object portion.

As another example, a method for producing an object can include receiving an additively manufactured object including a plurality of object portions. The method can also include identifying a location of a subset of the object portions on the object using at least one sensor (e.g., an imaging device). Subsequently, energy can be applied to the identified subset of the object portions so as to selectively modify the material properties of the subset. For example, in some embodiments, the object is initially in a partially-cured, "green" state, and the applied energy can selectively alter the degree of curing of the subset of object portions, without substantially affecting the degree of curing of the remaining object portions.

The embodiments described herein can provide numerous advantages. For example, the techniques described herein can provide accurate spatial control over the material properties of the object, which in turn can improve the function of the object. For instance, in embodiments where the object is an orthodontic appliance configured to apply force to a patient's teeth, the force distribution produced by the appliance can be adjusted by controlling the local material properties of the appliance, thus allowing for highly targeted forces for improved treatment efficacy. As another example, the heterogeneous properties can be used to facilitate separation of the object from sacrificial components (e.g., supports) that are not intended to be in the final product, thus improving manufacturability and reducing the likelihood of inadvertent damage to the object. Moreover, the techniques described herein allow for additive manufacturing of objects having heterogeneous properties from fewer materials, or even a single material type, thus enhancing scalability and reducing the complexity and/or cost of such manufacturing processes.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," and "lower" can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Overview of Additive Manufacturing Technology

FIG. 1 is a flow diagram providing a general overview of a method 100 for fabricating and post-processing an additively manufactured object, in accordance with embodiments of the present technology. The method 100 can be used to produce many different types of additively manufactured objects, such as orthodontic appliances (e.g., aligners, palatal expanders, retainers, attachments).

The method 100 begins at block 102 with producing an object using an additive manufacturing process. The additive manufacturing process can implement any suitable technique known to those of skill in the art. Additive manufacturing (also referred to herein as "3D printing") includes a variety of technologies which fabricate three-dimensional objects directly from digital models through an additive process. In some embodiments, additive manufacturing includes depositing a precursor material (e.g., a polymeric resin) onto a build platform. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

As described in greater detail below, in some embodiments, the process of block 102 involves forming the object by applying energy to the precursor material, with different energy application parameters used for different portions of the object. For example, different portions of the object can be formed using a range of different energy intensities, dosages, wavelengths, etc. The energy application parameters can be used to "program" the amount of residual precursor material that is removed from the object in the subsequent material removal process of block 104, as discussed further below. In other embodiments, however, the entire object can be formed using the same energy application parameters.

The methods described herein are suitable for use with a wide variety of additive manufacturing techniques. Examples of additive manufacturing techniques include, but are not limited to, the following: (1) vat photopolymerization, in which an object is constructed from a vat of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn through a nozzle, heated, and deposited layer-by-layer, such as fused deposition modeling (FDM), and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using a vat photopolymerization process in which light is used to selectively cure a vat or reservoir of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the vat, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Pat. No. 10,162,264 and U.S. Patent Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting holographic light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the additively manufactured object can be fabricated using a powder bed fusion process (e.g., selective laser sintering) involving using a laser beam to selectively fuse a layer of powdered material according to a desired cross-sectional shape in order to build up the object geometry. For instance, powders that have photoreactive groups and/or can undergo polymerization can be used to form an object via powder bed fusion in combination with the grayscaling techniques described herein. As another example, the additively manufactured object can be fabricated using a material extrusion process (e.g., fused deposition modeling) involving selectively depositing a thin filament of material (e.g., thermoplastic polymer) in a layer-by-layer manner in order to form an object. Light or other energy can be used to selectively cure portions of the extruded filament, e.g., in accordance with the techniques described in U.S. Patent Publication No. 2022/0184883, the disclosure of which is incorporated by reference herein in its entirety. In yet another example, the additively manufactured object can be fabricated using a material jetting process involving jetting or extruding one or more materials onto a build surface in order to form successive layers of the object geometry.

The additively manufactured object can be made of any suitable material or combination of materials. As discussed above, in some embodiments, the additively manufactured object is made partially or entirely out of a precursor material that is composed of one or more reactive components that change form when exposed to energy (e.g., electromagnetic energy, acoustic energy, radiation energy). The change in form can include, for example, changing from a monomeric form to an oligomeric and/or polymeric form, changing from an amorphous form to a crystalline form, changing from a liquid or semi-liquid form to a solid or semi-solid form, changing from a particulate or filament form to a continuous solid form, or combinations thereof.

For example, the precursor material can be a curable material, such as a resin. The resin can be composed of one or more polymerizable components, such as one or more monomers. The resin can initially be in a liquid state at room temperature (e.g., 20° C.) or at an elevated temperature (e.g., a temperature within a range from 50° C. to 120° C.). When exposed to energy, the monomers can undergo a polymerization reaction such that the resin solidifies into the desired object geometry. The monomers can be any molecule or compound capable of forming bonds with other monomers, thus resulting in a larger molecule with increased molecular weight. For example, the monomers can be vinylic monomers, cyclic monomers, monomers with functional groups that form covalent or ionic bonds, etc. In some embodiments, the bond-forming reaction occurs multiple times, such that the molecular weight of the resultant molecule increases with each successive bond-forming reaction. Examples of bond-forming reactions suitable for use with the techniques described herein include, but are not limited to, free radical polymerization, ionic polymerization, condensation polymerization, Diels-Alder reactions, photodimerization, carbene formation, nitrene formation, and suitable combinations thereof.

Alternatively or in combination, the polymerizable components can include reactive polymers and/or oligomers. The oligomers and/or polymers can react with each other, monomers, and/or other components to form larger molecules, e.g., via any of the bond-forming reactions described above.

In some embodiments, the polymerizable components (e.g., low molecular weight monomers, oligomers, polymers) form a high modulus phase within a polymerized material. In such embodiments, this phase can provide sufficient strength to the green state object to survive post-processing and/or can direct the final shape of the printed object. Alternatively, the polymerizable components can form a low modulus phase within the polymerized material or otherwise lower the local modulus of the object.

In some embodiments, the polymerizable components include one or more of the following: an acrylate monomer, a methacrylate monomer, a thiol monomer, a vinyl acetate monomer, a vinyl ether monomer, a vinyl chloride monomer, a vinyl silane monomer, a vinyl siloxane monomer, a styrene monomer, an allyl ether monomer, an acrylonitrile monomer, a butadiene monomer, a norbornene monomer, a maleate monomer, a fumarate monomer, an epoxide monomer, an anhydride monomer, or a hydroxyl monomer. In some embodiments, the polymerizable components include one or more reactive functional groups, such as one or more of the following: an acrylate, a methacrylate, an acrylamide, a vinyl group, a vinyl ether, a thiol, an allyl ether, a norbornene, a vinyl acetate, a maleate, a fumarate, a methylenemalonate, a maleimide, an epoxide, a ring-strained cyclic ether, a ring-strained thioether, a cyclic ester, a cyclic carbonate, a cyclic silane, a cyclic siloxane, a hydroxyl, an amine, an isocyanate, a blocked isocyanate, an acid chloride, an activated ester, an oxetane, a Diels-Alder reactive group, a furan, a cyclopentadiene, an anhydride, a group favorable toward photodimerization (e.g., an anthracene, an acenaphthylene, or a coumarin), a group that photodegrades into a reactive species (e.g., Norrish Type 1 and 2 materials), an azide, a derivative thereof, or a combination thereof. Additional examples of polymerizable components that may be used are provided in U.S. Pat. No. 10,495,973 and U.S. Patent Publication Nos. 2021/0147672, 2021/0395420, 2022/0380502, and 2023/0021953, the disclosures of each of which are incorporated by reference herein in their entirety.

The curable material can include various additives, such as catalysts, blockers, viscosity modifiers, fillers, binders, reactive diluents, solvents, pigments and/or dyes, stabilizers, surface-active compounds, etc. For example, in some embodiments, the curable material includes a catalyst that, when exposed to energy, forms a reactive species that catalyzes a bond-forming reaction. The catalyst can be a photocatalyst that is activated or otherwise created by absorption of light (e.g., infrared light, visible light, or ultraviolet (UV) light). Examples of photocatalysts include, but are not limited to, photoinitiators (e.g., radical initiators, cationic initiators), photoacid generators, and photobase generators.

In some embodiments, the curable material includes a blocker that limits the depth of energy penetration into the curable material during the additive manufacturing process. For example, the blocker can be a photoblocker that absorbs the irradiating wavelength responsible for causing photoreactions (e.g., activation of a photocatalyst or photodimerization reaction).

In some embodiments, the curable material includes a viscosity modifier. The viscosity modifier can be a component that increases the viscosity of the curable material (e.g., a filler, binder, thixotropic agent). Alternatively, the viscosity modifier can be a component that decreases the viscosity of the curable material (e.g., reactive diluent, solvent).

In some embodiments, the curable material includes a filler. The filler can be an organic or inorganic filler, such as fumed silica, core-shell particles, talc, titanium dioxide, sugar, nanocellulose, graphite, carbon black, carbon nanotubes, etc.

In some embodiments the curable material includes a binder. The binder can be a high molecular weight polymer that is added to the curable material to increase the viscosity and/or to enhance various material properties after curing, such as polymethylmethacrylate, acrylonitrile butadiene styrene (ABS), etc.

In some embodiments, the curable material includes a reactive diluent. The reactive diluent can decrease the viscosity of the curable material, while also reacting with one or more other components to form part of the object.

In some embodiments, the curable material includes a solvent. The solvent can decrease the viscosity of the curable material and/or compatibilize two or more components of the curable material.

In some embodiments, the curable material includes a pigment and/or dye. The pigment and/or dye (e.g., titanium dioxide, red dye #40, carbon black) can add color and/or other function to the object.

In some embodiments, the curable material includes a stabilizer configured to stabilize one or more components (e.g., to prevent precipitation, aggregation, degradation). For example, the stabilizer can be an emulsifier that stabilizes the components of an emulsion.

In some embodiments, the curable material includes a surface-active compound. The surface-active compound can enhance wetting or adhesion of the curable material and/or object to another surface. Alternatively or in combination, the surface-active compound can facilitate debonding of the curable material and/or object to another surface. Examples or surface-active compounds include, but are not limited to, wax, silicone compounds, silanes, fluorinated compounds, etc.

Optionally, some or all of the components of the curable material can serve more than one function within the curable material and/or the printed object. For example, reactive diluents can be monomers and can also serve as viscosity modifiers; carbon black can be a pigment and also a photoblocker; and so on.

In some embodiments, the additively manufactured object is formed from a single type of material, such that the entire object has the same chemical composition, although the local characteristics of the object can vary (e.g., with respect to degree of curing and/or crosslink density). For example, the entire object can be formed from the same curable material (which can include a single component or can include multiple components as described elsewhere herein). In embodiments where a vat photopolymerization technique is used (e.g., SLA, DLP), the object can be fabricated using a single vat of curable material, rather than switching between multiple vats containing different material types.

Alternatively, the additively manufactured object can be fabricated from a plurality of different material types (e.g., at least two, three, four, five, or more different material types), such that different portions of the object can have different chemical compositions. The material types can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the methods herein, then a second portion of the object can be formed from a second material in accordance with methods herein, and so on, until the entirety of the object has been formed.

After the additively manufactured object is fabricated, the object can undergo one or more additional process steps, also referred to herein as "post-processing." As described in detail below with respect to blocks 104-108, post-processing can include removing residual material from the object, applying additional material(s) to the object, performing additional curing, and/or separating the object from any substrates, supports, and/or other structures that are not intended to be present in the final product.

For example, at block 104, the method 100 continues with removing residual material from the additively manufactured object. The residual material can include uncured material (e.g., unpolymerized liquid resin), components that have not been incorporated into the bulk of the object (e.g., additives), and/or other unwanted or excess material (e.g., debris) that remains on or within the object after the additive manufacturing process. For example, in some embodiments, the curable material includes at least one component to be removed, which may or may not be a monomer. The component to be removed can be a polymerizable component (e.g., unreacted monomers, free oligomers and/or polymers), a photocatalyst, and/or other additives such as photoblockers, fillers, dyes, solvents, etc. The component to be removed may or may not have been a reactive component in the curable material.

The residual material can be removed in many different ways, such as by exposing the object to a solvent (e.g., via spraying, immersion), heating or cooling the object, applying a vacuum to the object, applying mechanical forces to the object (e.g., vibration, agitation, centrifugation), and/or other suitable techniques. Additional details of material removal processes suitable for use with the present technology are provided further below.

In some embodiments, the amount of residual material removed from a particular portion of the object varies based on the local characteristics (e.g., degree of curing and/or crosslink density) of the object. As discussed in greater detail below, the amount of material removed from each object portion can be controlled based on the energy application parameters previously used to form that object portion in block 102, and the amount of material removed can influence the local properties (e.g., modulus, glass transition temperature ($T_g$), elongation to break) of that object portion.

At block 106, the method 100 can optionally include post-curing the additively manufactured object. Post-curing can be used in situations where the object is still in a partially cured "green" state after the additive manufacturing process of block 102. For example, the energy used to form the object in block 102 may only partially polymerize the curable material forming the object. Accordingly, the post-curing step may be needed to increase the degree of curing of the object to a final, usable state. Post-curing can provide various benefits, such as improving the material properties (e.g., stiffness, strength, $T_g$) and/or temperature stability of the object. Post-curing can be performed by applying energy (e.g., UV, visible, infrared, microwave) to the object, or suitable combinations thereof.

In some embodiments, the post-curing process of block 106 involves applying energy to certain portions of the object to selectively modify one or more material properties of that portion, as described in greater detail below. For example, the applied energy can selectively increase or decrease the degree of curing (e.g., degree of polymerization and/or DBC), crosslinking density, etc., of the targeted object portions, while having little or no effect on the remaining object portions. In other embodiments, the post-curing process of block 106 can involve applying energy uniformly to the entirety of the object. Optionally, the post-curing process of block 106 can involve a first stage in which energy is selectively applied to certain object portions only, and a second stage in which energy is applied to the entire object. In other embodiments, however, the post-curing process of block 106 is optional and can be omitted.

At block 108, the method 100 can optionally include separating the additively manufactured object from a substrate. In some embodiments, the substrate is a build platform which mechanically supports the object during fabrication and the post-processing steps described herein. The additively manufactured object can be connected to the substrate via a sacrificial region of cured material (e.g., supports and/or a raft). Accordingly, the additively manufactured object can be detached from the substrate by applying pressure to fracture the sacrificial region. In some embodiments, the sacrificial region is made of the same material(s) as the object, but can be configured to have weaker mechanical properties (e.g., increased brittleness) than the object using the techniques described herein. Once separated, the additively manufactured object can then be prepared for packaging, shipment, and use.

The method 100 can be modified in many different ways. For example, although the above steps of the method 100 are described with respect to a single object, the method 100 can be used to sequentially or concurrently fabricate and post-process any suitable number of objects, such as tens, hundreds, or thousands of additively manufactured objects. As another example, the ordering of the processes shown in FIG. 1 can be varied. Some of the processes of the method 100 can be omitted, such as any of the processes of blocks 106 and/or 108. The method 100 can also include additional processes not shown in FIG. 1, such as applying surface treatments, polishing, washing, etc. For example, the method 100 can include a surface cleaning process before the post-curing process of block 106. The surface cleaning process can involve removing residual material (e.g., unpolymerized resin) from one or more surfaces of the additively manufactured object, such as by washing (e.g., spraying or immersing in a solvent), heating, cooling, applying mechanical forces (e.g., centrifugation), etc. In some embodiments, the surface cleaning process is differentiated from the material removal process of block 104 in that the surface cleaning process is intended to remove residual material from object surfaces only, and does not remove significant amounts of residual material (e.g., less than 10%, 5%, 2%, or 1% of the residual material) from other portions of the object (e.g., the object interior).

Figure 2:
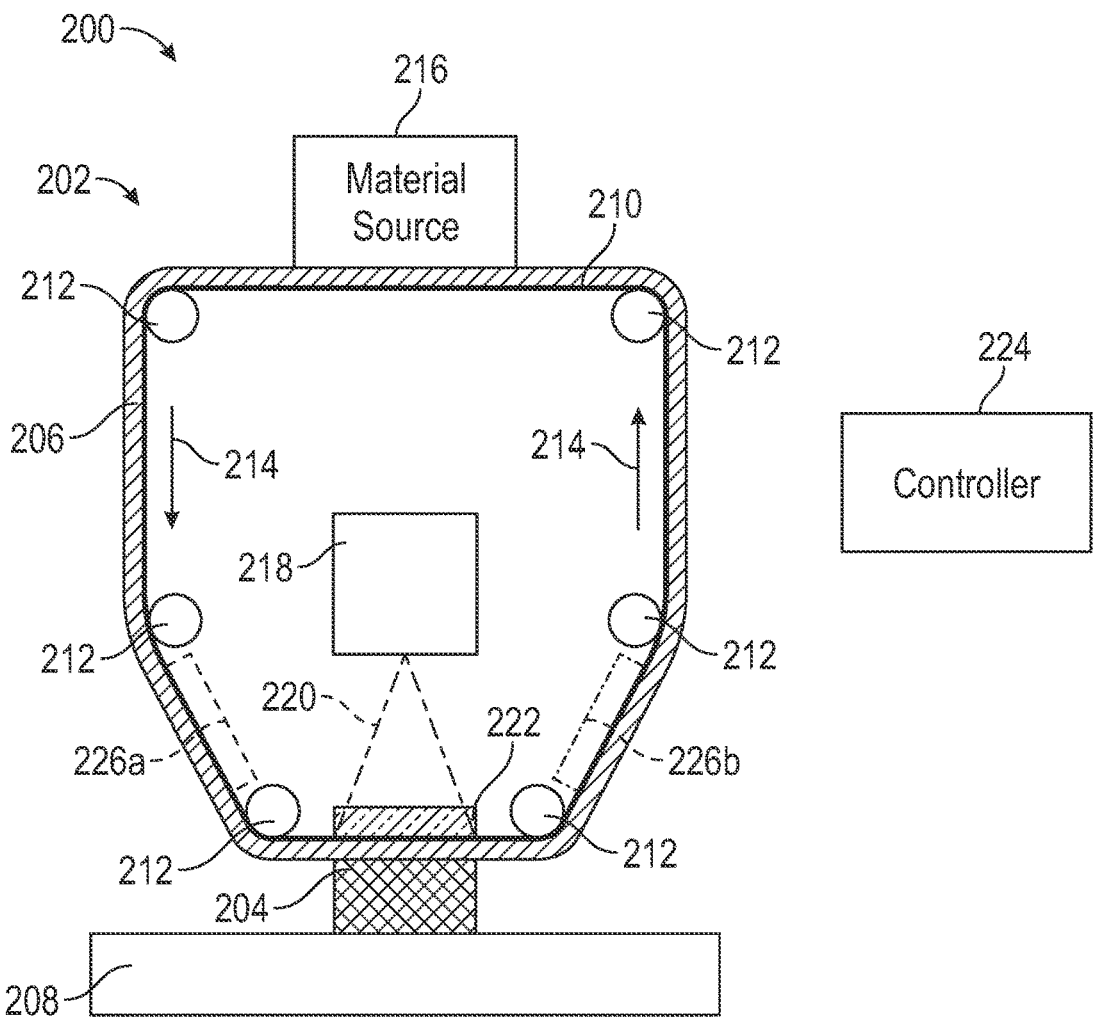
FIG. 2 is a partially schematic illustration of a system for additive manufacturing configured in accordance with embodiments of the present technology.

FIG. 2 illustrates a representative example of a system 200 for additive manufacturing configured in accordance with embodiments of the present technology. The system 200 can be used to fabricate any embodiment of the objects described herein. For example, the system 200 can be used to produce an object in accordance with block 102 of the method 100 of FIG. 1.

The system 200 includes a printer assembly 202 configured to fabricate an additively manufactured object 204 ("object 204") using any of the additive manufacturing processes described herein. The printer assembly 202 is configured to deposit a curable material 206 (e.g., a polymeric resin or other solidifiable precursor material) on a build platform 208 (e.g., a tray, plate, film, sheet, or other planar substrate) to form the object 204. In the illustrated embodiment, the printer assembly 202 includes a carrier film 210 configured to deliver the curable material 206 to the build platform 208. The carrier film 210 can be a flexible loop of material having an outer surface and an inner surface. The outer surface of the carrier film 210 can adhere to and carry a thin layer of the curable material 206. The inner surface of the carrier film 210 can contact one or more rollers 212 that rotate to move the carrier film 210 in a continuous loop trajectory, e.g., along the direction indicated by arrow 214.

The printer assembly 202 can also include a material source 216 (shown schematically) configured to apply the curable material 206 to the carrier film 210. In the illustrated embodiment, the material source 216 is located at the upper portion of the printer assembly 202. In other embodiments, however, the material source 216 can be at a different location in the printer assembly 202. The material source 216 can include nozzles, ports, reservoirs, etc., that deposit the curable material 206 onto the outer surface of the carrier film 210. The material source 216 can also include one or more blades (e.g., doctor blades, recoater blades) that smooth the deposited curable material 206 into a relatively thin, uniform layer. For example, the curable material 206 can be formed into a layer having a thickness within a range from 200 microns to 300 microns, or any other desired thickness.

The curable material 206 can be conveyed by the carrier film 210 toward the build platform 208. In the illustrated embodiment, the build platform 208 is located below the printer assembly 202. In other embodiments, however, the build platform 208 can be positioned at a different location in the printer assembly 202. The distance between the carrier film 210 and build platform 208 can be adjustable so that the curable material 206 at can be brought into direct contact with the surface of the build platform 208 (when printing the initial layer of the object 204) or with the surface of the object 204 (when printing subsequent layers of the object 204). For example, the build platform 208 can include or be coupled to a motor (not shown) that raises and/or lowers the build platform 208 to the desired height during the manufacturing process.

The printer assembly 202 includes an energy source 218 (e.g., a projector or light engine) that outputs energy 220 (e.g., light, such as UV light) having a wavelength configured to partially or fully cure the curable material 206. The carrier film 210 can be partially or completely transparent to the wavelength of the energy 220 to allow the energy 220 to pass through the carrier film 210 and onto the portion of the curable material 206 above the build platform 208. Optionally, a transparent plate 222 can be disposed between the energy source 218 and the carrier film 210 to guide the carrier film 210 into a specific position (e.g., height) relative to the build platform 208. During operation, the energy 220 can be patterned or scanned in a suitable pattern onto the curable material 206, thus forming a layer of cured material onto the build platform 208 and/or on a previously formed portion of the object 204. The geometry of the cured material can correspond to the desired cross-sectional geometry for the object 204. The parameters for operating the energy source 218 (e.g., energy intensity, energy dosage, exposure time, exposure pattern, exposure wavelength, energy density, power density) can be set based on instructions from a controller 224, as described in further detail below.

Once the object cross-section has been formed, the build platform 208 can be lowered by a predetermined amount to separate the cured material from the carrier film 210. The remaining curable material 206 can be carried by the carrier film 210 away from the build platform 208 and back toward the material source 216. The material source 216 can deposit additional curable material 206 onto the carrier film 210 and/or smooth the curable material 206 to re-form a uniform layer of curable material 206 on the carrier film 210. The curable material 206 can then be recirculated back to the build platform 208 to fabricate an additional layer of the object 204. This process can be repeated to iteratively build up individual object layers on the build platform 208 until the object 204 is complete. The object 204 and build platform 208 can then be removed from the system 200 for post-processing.

In some embodiments, the system 200 is used in a high temperature lithography process utilizing a highly viscous curable material 206 (e.g., a highly viscous resin). Accordingly, the printer assembly 202 can include one or more heat sources (heating plates, infrared lamps, etc.) for heating the curable material 206 to lower the viscosity to a range suitable for additive manufacturing. For example, the printer assembly 202 can include a first heat source 226a positioned against the segment of the carrier film 210 before the build platform 208, and a second heat source 226b positioned against the segment of the carrier film 210 after the build platform 208. Alternatively or in combination, the printer assembly 202 can include heat sources at other locations.

The system 200 also includes a controller 224 (shown schematically) that is operably coupled to the printer assembly 202 and build platform 208 to control the operation thereof. The controller 224 can be or include a computing device including one or more processors and memory storing instructions for performing the additive manufacturing operations described herein. For example, the controller 224 can receive a digital data set (e.g., a three-dimensional model) representing the object 204 to be fabricated, determine a plurality of object cross-sections to build up the object 204 from the curable material 206, and can transmit instructions to the energy source 218 to output energy 220 to form the object cross-sections. As described above and in greater detail below, the controller 224 can control the energy application parameters of the energy source 218, such as the energy intensity, energy dosage, exposure time, exposure pattern, energy wavelength, and/or energy type of the energy 220 applied to the curable material 206. Optionally, the controller 224 can also determine and control other operational parameters, such as the positioning of the build platform 208 (e.g., height) relative to the carrier film 210, the movement speed and direction of the carrier film 210, the amount of curable material 206 deposited by the material source 216, the thickness of the material layer on the carrier film 210, and/or the amount of heating applied to the curable material 206.

Although FIG. 2 illustrates a representative example of a system 200 for additive manufacturing, this is not intended to be limiting, and the methods described herein can be implemented using other types of additive manufacturing systems, such as material jetting systems, binder jetting systems, material extrusion systems, powder bed fusion systems, sheet lamination systems, or directed energy deposition systems.

II. Methods for Producing Objects with Heterogenous Properties

In some embodiments, the present technology provides methods for producing objects with spatially controlled differences in properties, also referred to interchangeably herein as objects with "heterogeneous properties," "variable properties," or "anisotropic properties." For example, an object with heterogeneous properties can include a plurality of object portions at different spatial locations in the object. The plurality of object portions can differ from each other with respect to at least one material property, such as one or more of the following: modulus (e.g., elastic modulus, flexural modulus, storage modulus), glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, and/or durability. In some embodiments, the object includes two, three, four, five, six, seven, eight, nine, 10, 20, 30, 40, 50, or more object portions that have different material properties. Each of these object portions may differ from at least one other object portion with respect to one, two, three, four, five, or more material properties.

Figure 3:
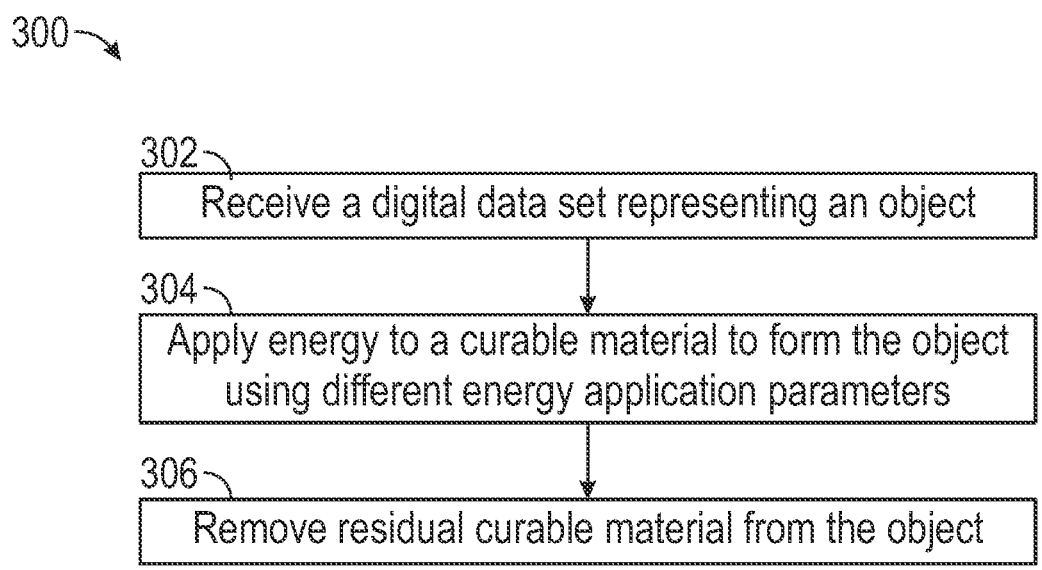
FIG. 3 is a flow diagram illustrating a method for producing an object having heterogeneous properties, in accordance with embodiments of the present technology.

FIG. 3 is a flow diagram illustrating a method 300 for producing an object having heterogeneous properties, in accordance with embodiments of the present technology. The method 300 can be performed using any suitable system or device, such as the system 200 of FIG. 2. In some embodiment, some or all of the processes of the method 300 are implemented as computer-readable instructions (e.g., program code) that are configured to be executed by one or more processors of a computing device, such as the controller 224 of FIG. 2. The method 300 can be combined with any of the other methods described herein, such as the method 100 of FIG. 1.

The method 300 begins at block 302 with receiving a digital data set representing an object. The digital data set can be or include any suitable data type that depicts the geometry of the object to be manufactured. For example, the object can be an orthodontic appliance for treating a patient's teeth (e.g., an aligner, palatal expander, retainer, attachment placement device), and the digital data set can be or include a three-dimensional model of the appliance (e.g., in STL format, CLI format, CAD format).

In some embodiments, the digital data set includes instructions for fabricating the object via an additive manufacturing process, such as DLP, SLA, or any of the other techniques described herein. For example, in embodiments where the additive manufacturing process involves building up the object from a plurality of material layers, the digital data set can include instructions for slicing the object geometry into multiple cross-sections corresponding to the multiple material layers. As another example, in embodiments where the additive manufacturing process involves applying energy to a curable material to form the object, the digital data set can include instructions for controlling one or more energy application parameters to be used when forming the object, such as the energy intensity, energy dosage (e.g., energy intensity×exposure time), exposure time, energy wavelength, and/or energy type.

In some embodiments, the instructions include a plurality of coordinates (e.g., pixel or voxel coordinates), with each coordinate representing a location in the object. The instructions can also include a plurality of values, each value associated with a corresponding coordinate and representing a setting for an energy application parameter for the corresponding location in the object. For example, the value can represent an energy intensity level, exposure time period, energy dosage level, etc., to be used when forming the portion of the object at the associated coordinate location. The value can be a binary value if there are only two options for the energy application parameter, or can be a non-binary (e.g., grayscale) value if there are more than two options for the energy application parameter (e.g., a continuous range of options, or three or more discrete options). For example, the energy dosage per pixel (for DLP) or per laser hatch (for SLA) can be represented by a grayscale value, with white representing a higher (e.g., maximum) energy dosage, black representing a lower (e.g., minimum or zero) energy dosage, and gray representing intermediate energy dosages (e.g., one or more dosage levels between the minimum and maximum dosage levels). The energy dosage per pixel for DLP can be varied by adjusting the energy intensity and/or exposure time for that pixel, while the energy dosage per laser hatch for SLA can be varied by adjusting the energy intensity and/or scan speed for that laser hatch.

At block 304, the method 300 continues with applying energy to a curable material to form the object. Any suitable type of energy can be used, such as electromagnetic energy (e.g., infrared light, visible light, UV light, microwaves), acoustic energy, and/or radiation energy (e.g., alpha radiation, beta radiation, neutron radiation). The energy can cause a change in the curable material to build up the object geometry, such as chemical reactions (e.g., polymerization), melting, coalescing, hardening, solidifying, etc. For example, the curable material can include one or more polymerizable components, such as monomers, reactive oligomers, and/or reactive polymers. The polymerizable components can undergo a polymerization reaction when exposed to energy (e.g., light). The curable material can optionally include additives that facilitate the polymerization reaction and/or serve other functions in the curable material, as described elsewhere herein. In some embodiments, the object is formed from a single type of curable material (e.g., a single vat of starting material for a vat-based process). For example, the object can be formed from the curable material by a repeated series of layer-by-layer energy exposures to create a three-dimensional structure.

The energy can be applied to the curable material in a manner such that different portions of the object are formed using different energy application parameters, such as different energy intensities, dosages, exposure times, wavelengths, and/or energy types. For example, the object can include a first object portion formed using a first set of energy application parameters (e.g., a first energy dosage), a second object portion formed using a second set of energy application parameters different from the first set (e.g., a second energy dosage), a third object portion formed using a third set of energy application parameters different from the first and second sets (e.g., a third energy dosage), and so on.

Figure 4A:
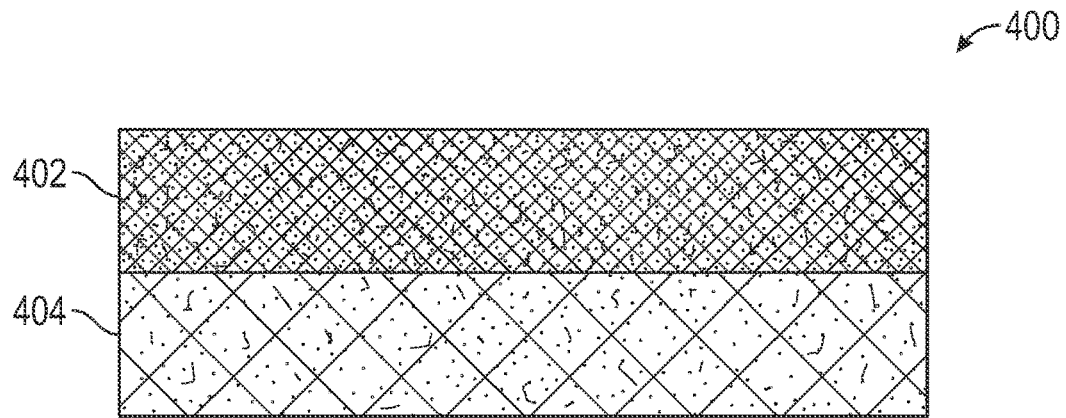
FIG. 4A is a schematic illustration of an object including a first object portion and a second object portion, in accordance with embodiments of the present technology.

For example, FIG. 4A is a schematic illustration of an object 400 including a first object portion 402 and a second object portion 404, in accordance with embodiments of the present technology. In some embodiments, the first object portion 402 is formed using a first energy intensity, and the second object portion 404 is formed using a second, different energy intensity. The ratio of the first energy intensity to the second energy intensity can be greater than or equal to 1.5:1, 2:1, 3:1, 4:1, 5:1, 6:1, 7:1, 8:1, 9:1, or 10:1. The first energy intensity can be at least 10%, 20%, 30%, 40%, 50%, 60%, 70%, 80%, 90%, 95%, or 100% of the maximum possible energy intensity; and/or the second energy intensity can be no more than 90%, 80%, 70%, 60%, 50%, 40%, 30%, 20%, 10%, 5%, or 1% of the maximum possible energy intensity.

Alternatively or in combination, the first object portion 402 can be formed using a first energy dosage, and the second object portion 404 can be formed using a second energy dosage. The ratio of the first energy dosage to the second energy dosage can be greater than or equal to 1.5:1, 2:1, 3:1, 4:1, 5:1, 6:1, 7:1, 8:1, 9:1, or 10:1. The first energy dosage can be at least 10%, 20%, 30%, 40%, 50%, 60%, 70%, 80%, 90%, 95%, or 100% of the maximum possible energy dosage; and/or the second energy dosage can be no more than 90%, 80%, 70%, 60%, 50%, 40%, 30%, 20%, 10%, 5%, or 1% of the maximum possible energy dosage.

Alternatively or in combination, the first object portion 402 can be formed using a first exposure time, and the second object portion 404 can be formed using a second exposure time, and the ratio of the first exposure time to the second exposure time can be greater than or equal to 1.5, 2:1, 3:1, 4:1, 5:1, 6:1, 7:1, 8:1, 9:1, or 10:1. The first exposure time can be at least 10%, 20%, 30%, 40%, 50%, 60%, 70%, 80%, 90%, 95%, or 100% of the maximum possible exposure time; and/or the second exposure time can be no more than 90%, 80%, 70%, 60%, 50%, 40%, 30%, 20%, 10%, 5%, or 1% of the maximum possible exposure time.

Alternatively or in combination, the first object portion 402 can be formed using a first energy wavelength, and the second object portion 404 can be formed using a second energy wavelength. The first energy wavelength can be shorter than the second energy wavelength, or vice-versa. For instance, the first wavelength can be greater than or less than the second energy wavelength by at least 10 nm, 15 nm, 20 nm, 25 nm, 30 nm, 40 nm, 50 nm, 75 nm, or 100 nm. The first and second energy wavelengths can each be independently selected from any of the following: from 100 nm to 200 nm, 200 nm to 300 nm, 300 nm to 400 nm, 300 nm to 350 nm, 350 nm to 400 nm, 350 nm to 375 nm, 375 nm to 400 nm, 400 nm to 500 nm, 400 nm to 450 nm, 400 nm to 425 nm, 500 nm to 600 nm, 600 nm to 700 nm, 700 nm to 800 nm, 800 nm to 900 nm, 900 nm to 1000 nm, or 1000 nm to 1100 nm.

Referring again to FIG. 3, the energy application parameters used in the process of block 304 can be configured to spatially control the amount of residual curable material (e.g., monomers, oligomers, and/or polymers) that will be removed from different portions of the object in a subsequent material removal process (e.g., the process of block 306). Specifically, the energy application parameters used to form a particular object portion can affect the local characteristics of that object portion. In turn, the local characteristics of the object portion can affect the amount of residual curable material removed from that object portion. The ability to vary the parameters of the applied energy over different spatial locations (e.g., in x, y, and/or z directions) in order to program the amount of residual curable material removed may also be referred to herein as "grayscaling" or "grayscale programming."

The applied energy can control the amount of residual curable material to be removed from a particular object portion in various ways, such as by causing heating, melting, coalescing, hardening, chemical reactions (e.g., chemical bond formation, chemical bond breaking), changes in morphology, changes in phase, and/or other changes to the local characteristics of the curable material that affect material removal. For example, object portions formed using different energy application parameters can exhibit a difference in one or more of the following local characteristics: degree of curing of the curable material (e.g., degree of polymerization of the curable material, DBC of the curable material), crosslink density, phase, crystallinity, morphology, permeability, solubility, viscosity, swellability, reactivity, degradability, porosity, particle connectivity, surface area, and/or melting point.

For example, in some embodiments, the curable material includes a polymerizable component, and the applied energy causes polymerization of the polymerizable component. Object portions formed using higher energy dosages, higher energy intensities, and/or longer exposure times can exhibit a higher degree of curing (e.g., higher degree of polymerization and/or DBC) of the curable material. Conversely, object portions formed using lower energy dosages, lower energy intensities, and/or shorter exposure times can exhibit a lower degree of curing (e.g., lower degree of polymerization and/or DBC) of the curable material. In some embodiments, it is easier to remove residual curable material from object portions having a higher degree of curing, and it is more difficult to remove residual curable material from object portions having a lower degree of curing.

Alternatively or in combination, different wavelengths of energy can be used to control the degree of curing and, thus, the amount of residual curable material present in an object portion. A shorter energy wavelength can have a higher molar absorptivity for a given photoinitiator than a longer energy wavelength, and thus can exhibit less penetration depth into the curable material than a longer energy wavelength. Accordingly, the shorter energy wavelength can be applied to a particular layer with a higher energy intensity and/or longer exposure time without also curing the previous layer of material, whereas using a higher energy intensity and/or longer exposure time with the longer energy wavelength may result in curing of the previous layer. The shorter energy wavelength can therefore be used to selectively increase the degree of curing within a portion of a layer to reduce the amount of residual curable material (e.g., free monomer) within that portion. In some embodiments, the longer energy wavelength is first applied to create a layer of cured material, then the shorter energy wavelength is selectively applied to one or more portions of that layer to increase the degree of cure at the one or more portions of the layer. This technique can be used to selectively increase the green state strength of certain object portions and/or create greater differences in properties of the object across different object portions, as described further below. Optionally, some degree of curing of the previous layer may be acceptable, e.g., if it is desirable for the previous layer to exhibit a higher green state strength.

In some embodiments, the object includes at least two object portions formed using different energy application parameters, such as a first object portion and a second object portion. For example, referring again to FIG. 4A, the first object portion 402 can have a degree of curing of at least 10%, 20%, 30%, 40%, 50%, 60%, 70%, 80%, 90%, 95%, or 99%; and the second object portion 404 can have a degree of curing of no more than 90%, 80%, 70%, 60%, 50%, 40%, 30%, 20%, 10%, 5%, or 1%. Alternatively or in combination, the first object portion 402 can have a degree of polymerization of at least 20, 50, 100, 200, 300, 400, 500, 600, 700, 800, 900, 1000, 1500, or 2000; and the second object portion 404 can have a degree of polymerization of no more than 1500, 1000, 900, 800, 700, 600, 500, 400, 300, 200, 100, 50, 20, or 10. Alternatively or in combination, the first object portion 402 can have a DBC of at least 10%, 20%, 30%, 40%, 50%, 60%, 70%, 80%, 90%, 95%, or 99%; and the second object portion 404 can have a DBC of no more than 90%, 80%, 70%, 60%, 50%, 40%, 30%, 20%, 10%, 5%, or 1%.

Referring again to FIG. 3, optionally, the applied energy of block 304 can cause a chemical reaction that adds or removes a capping agent from a polymerizable component (e.g., a monomer, oligomer, or polymer). The capping agent can be added to or removed from a chain end and/or from pendant groups on a chain. The capping agent can affect material removal in various ways, such as by altering the solubility, diffusivity, permeability, degradability (e.g., by solvent and/or heat), etc., of the polymerizable component.

The process of block 304 can use any suitable type of energy, such as electromagnetic energy (e.g., encompassing any wavelength from gamma waves to microwaves), acoustic energy (e.g., ultrasonic energy), radiation (e.g., electron beams, alpha particles), or suitable combinations thereof. For example, ultrasonic energy, which can be applied via an ultrasonic horn by direct contact or indirectly through a medium, can create heated areas at or near the point of contact that change the local characteristics of the curable material.

As another example, electromagnetic energy can produce photoreactions (e.g., dimerization, isomerization, cleavage, catalyst generation) that alter the local characteristics of the curable material. For instance, photoisomerization can be used to program the amount of material to be removed. Molecules such as azobenzenes can undergo isomerization that changes their properties (e.g., crystallinity, pH, color, shape, solubility, ligation, chelation). These changes can facilitate or obstruct removal of the molecule during the removal process. For example, a change in form from amorphous to crystalline can reduce solubility in a solvent, and thus obstruct solvent-based removal. Alternatively, a change in form from crystalline to amorphous can increase solubility in the solvent, and thus enhance solvent-based removal. In embodiments where small molecules are used, a change in form from crystalline to non-crystalline can change the vapor pressure and/or boiling point of the material to be removed, which can change the efficacy of vacuum-based extraction. As another example, photoreactions can be used to change chelation to metal ions, which can cause a change in properties such as vapor pressure, solubility, melting point, etc. In a further example, photoreactions can cause the cleaving of groups from a polymer matrix, thus creating low molecular weight components that can be removed. Conversely, photoreactions can cause low molecular weight components to bond to the polymer matrix, thus obstructing removal.

The energy application parameters that correlate to a targeted amount of material removal can be determined in many different ways. For example, the appropriate energy application parameters can be identified from a calibration curve, lookup table, or other suitable data structure showing an experimentally determined relationship between the value of a particular energy application parameter and the corresponding amount of material removed. Alternatively or in combination, the appropriate energy application parameters can be determined using simulations, mathematical models, and/or trained machine learning algorithms.

At block 306, the method 300 includes removing residual curable material from the object. The residual curable material to be removed can include one or more components of the curable material that are not intended to be in the final product, such as reactive components that have not been polymerized or otherwise incorporated into the bulk of the object (e.g., free monomers, oligomers, and/or polymers), non-reactive components, and/or other unwanted or excess material that remains on or within the object after the process of block 304. For example, the object can be placed in a suitable apparatus (e.g., a chamber) configured to implement material removal via one or more suitable techniques, such as solvents, vacuum, heating, etc. Additional details and examples of material removal techniques suitable for use with the present technology are described below.

The amount of residual curable material removed from each object portion can correlate to the energy application parameters used to form that object portion. Specifically, the energy application parameters can spatially control the local characteristics of each object portion (e.g., via reactions, heating, melting, coalescing, and/or hardening) to selectively enhance or obstruct material removal from that object portion, such that different amounts of material are removed from object portions formed using different energy application parameters. For example, the applied energy can affect the degree of curing. It may be easier to remove residual curable material from object portions having a lower degree of curing, e.g., due to reduced steric hindrance. Object portions having a lower degree of curing may also exhibit increased permeability to and/or solubility in a solvent, which can also enhance material removal.

In some embodiments, the amount of material removed from an object portion affects the material properties of the object portion. Any reference herein to the material properties of an object or object portion may refer to the material properties before post-processing (e.g., when the object is in the green state before post-curing), after post-processing (e.g., after post-curing), or both. Examples of material properties that may be affected by material removal include, but are not limited to, any of the following: modulus (e.g., storage modulus), $T_g$, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, and durability. For example, a greater amount of material removal can correlate to a decreased modulus, decreased $T_g$, and/or decreased hardness. Conversely, a smaller amount of material removal can correlate to an increased modulus, increased $T_g$, and/or increased hardness. Accordingly, the material properties of an object portion can be programmed by controlling the energy application parameters used to form that object portion.

For example, in some embodiments, the residual curable material includes at least one polymerizable component (e.g., a monomer, reactive oligomer, or reactive polymer) that has a sufficiently low molecular weight to facilitate extraction, e.g., by a solvent, boiling, evaporation, sublimation, and/or other suitable techniques. The molecular weight (e.g., weight average molecular weight and/or number average molecular weight) of the low molecular weight component can be less than or equal to 2000 g/mol, 1500 g/mol, 1000 g/mol, 750 g/mol, 500 g/mol, 250 g/mol, or 100 g/mol. Optionally, higher molecular weight components can also be used if longer extraction times are used.

When the curable material is formed into the object during the process of block 304, the applied energy can cause the low molecular weight components to polymerize first statistically (e.g., due to concentration, reactivity ratios, diffusivity) to form a polymer network. Optionally, the polymer network can also include crosslinks to enhance stability. The dosage of applied energy can control the extent to which the low molecular weight components are incorporated into the formed polymer network. For instance, a higher energy dosage can correlate to more incorporation of the low molecular weight components, while a lower energy dosage can correlate to less incorporation of the low molecular weight components.

Subsequently, residual low molecular components that have not been incorporated into the polymer network can be removed from the object during the process of block 306. For example, when the green state object is exposed to solvent, the polymer network can swell to cause faster diffusion of the residual low molecular weight components out of the object. In some embodiments, object portions having fewer low molecular weight components incorporated into the polymer network (e.g., correlating to a lower degree of curing) exhibit a lower modulus, while object portions having more low molecular weight components incorporated into the polymer network (e.g., correlating to a higher degree of curing) exhibit a higher modulus.

In some embodiments, the curable material includes a plurality of components, such as a first component that is preferentially removed compared to a second component. For example, the first component can be a low molecular weight component, and the second component can be a high molecular weight component. Low molecular weight components can be easier to remove than high molecular weight components due to reduced bulkiness and/or steric hindrance. Alternatively or in combination, the first component can have a higher solubility in the solvent used in the removal process, and the second component can have a lower solubility in the solvent. The preferential removal of the first component can be used to spatially control the local material properties. In some embodiments, for example, the first component is a high $T_g$ component, and the second component is a low $T_g$ component. Accordingly, the local $T_g$ can be tuned by controlling the amount of the first component that is preferentially removed.

The material removal process of block 306 can include many different techniques. For example, in some embodiments, the residual curable material is removed by exposing the object to one or more solvents, e.g., by partially or fully immersing the object in the solvent(s), spraying solvent(s) onto and/or into the object, etc. The solvent can be selected to enhance removal of the residual curable material, while avoiding degradation, dissolution, and/or deformation (e.g., swelling) of curable material that has been incorporated into the object ("printed material"). For example, the solvent can be at least a moderate, good, or very good solvent for the residual curable material, to ensure substantially complete extraction of the residual curable material (e.g., at least 80%, 90%, 95%, 99%, or 99.9%) within a reasonable length of time (e.g., no more than 24 hours, 12 hours, 6 hours, 4 hours, 2 hours, 1 hour, 30 minutes, 10 minutes, 5 minutes, 2 minutes, or 1 minutes). In some embodiments, a solvent is characterized based on the amount that can be absorbed into a material, e.g., a "poor" solvent exhibits an absorption within a range from 0 wt % to 1 wt %, a "moderate" solvent exhibits an absorption within a range from 1 wt % to 5 wt %, a "good" solvent exhibits an absorption within a range from 5 wt % to 15 wt %, and a "very good" solvent exhibits an absorption greater than 15 wt %. The amount of solvent absorption can vary based on the local characteristics of the material such as the extent of curing, morphology, crystallinity, hydrophobicity, hydrophilicity, etc. Moreover, temperature may affect solubility and thus can be used to facilitate extraction (e.g., higher temperatures can be used to reduce the extraction time).

In some embodiments, the solvent is also a good or very good solvent for the printed material, in that the solvent can easily infiltrate into the printed material to facilitate the diffusion of the residual curable material out of the object. In other embodiments, however, the solvent can be a moderate or poor solvent for the printed material, in that the infiltration of the solvent into the printed material is limited, but the residual curable material can still diffuse out of the printed material and into the solvent. For example, water can be used as the solvent in embodiments where the printed material is a generally hydrophobic resin, and the residual curable material includes a hydrophilic component (e.g., poly(ethylene glycol) (PEG) oligomers). In such embodiments, the water is a poor solvent for the hydrophobic resin and will not substantially diffuse into the hydrophobic resin. However, the water can still be a good solvent for the hydrophilic component, such that any hydrophilic components present in the hydrophobic resin can preferentially diffuse out of the resin and into the water over time. In some embodiments, this approach is used with relatively thin objects (e.g., objects having a maximum thickness less than or equal to 1 cm, 5 mm, 4 mm, 3 mm, 2 mm, 1 mm, or 0.5 mm) to reduce the amount of time needed to extract the residual curable material.

In some embodiments, pores and/or channels are present in the object to facilitate removal of material. This approach can allow for efficient removal of residual material on a reasonable timescale (e.g., no more than 24 hours, 12 hours, 6 hours, 4 hours, 2 hours, 1 hour, 30 minutes, 10 minutes, 5 minutes, 2 minutes, or 1 minutes), even when the object is relatively thick (e.g., having a maximum thickness greater than 1 cm) and/or when the solvent is a moderate or poor solvent for the printed material. In some embodiments, such channels and/or pores can be used to facilitate preferential removal of material from certain object portions, in combination with the grayscaling techniques described herein. For instance, the porosity of an object portion can be controlled by varying the energy application parameters used to form that object portion.

In some embodiments, the solvent is selected to infiltrate differently into different object portions, depending on the local characteristics of each object portion. For example, the object can include a first object portion that exhibits reduced solvent infiltration, and a second object portion that exhibits increased solvent infiltration. The first object portion can be formed in accordance with the techniques herein to have a higher degree of curing (e.g., a higher degree of polymerization and/or a higher DBC); and the second object portion can be formed in accordance with the techniques herein to have a lower degree of curing (e.g., a lower degree of polymerization and/or a lower DBC). Increased solvent infiltration can correlate to an increase in the amount of residual curable material removed, while reduced solvent infiltration can correlate to a decrease in the amount of residual curable material removed. Solvent infiltration can be quantified in various ways, such as by measuring the weight percent increase of the object, nuclear magnetic resonance (NMR) spectroscopy, Fourier transform infrared (FTIR) spectroscopy, and/or other spectroscopic techniques.

Optionally, the solvent itself and/or a component added to the solvent can be configured to degrade a high molecular weight component into a lower molecular weight component that is easier to remove. For example, water (e.g., at physiological, low, or high pH values) can be used to degrade certain polymers or oligomers into smaller components. The solvent can also be heated to further enhance degradation (e.g., depolymerization).

The choice of solvent can also depend on other factors, such as the intended use of the object, the degree of accuracy desired for the object geometry, removability of the solvent, toxicity, biocompatibility, cost, etc. For example, the solvent can have characteristics that make it easier to remove from the object, such as a high vapor pressure, low boiling point, etc. Additionally, the solvent can be biocompatible, food grade, and/or otherwise generally recognized as safe, e.g., to limit any potential harm that may occur to living organisms that come into contact with the object if the solvent is not completely removed before use. The solvent can be a polar solvent (e.g., a polar protic solvent or a polar aprotic solvent) or a nonpolar solvent. The solvent can be an organic solvent or an inorganic solvent.

Examples of solvents suitable for use with the present technology include, but are not limited to, acetic acid, acetone, acetonitrile, ammonia, benzene, butanol, butyl acetate, camphor, carbon tetrachloride, chloroform, cyclohexanone, diethyl ether, dimethylformamide, dimethylsulfoxide, dioxane, ethanol, ethyl acetate, ethyl cellosolve, ethyl lactate, ethylene glycols, eugenol, glycerin, heptanes, hexanes, isoamyl acetate, isopropyl acetate, isopropyl alcohol, liquid or low melting sugars, low melting or high melting waxes, menthol, methanol, methylene chloride, phenols, propanol, propylene carbonate, propylene glycols, pressurized gases, silicone oils (e.g., aliphatic and/or aromatic), soapy water, supercritical carbon dioxide, tetrahydrofuran, toluene, triacetin, turpentine, vanillin, vegetable oils, water, xylene, and suitable combinations thereof. In some embodiments, multiple types of solvents can be used concurrently or sequentially to remove the residual curable material. Optionally, the process of block 306 can involve performing multiple solvent washes. Some or all of the solvent washes can use the same solvent, or some or all of the solvent washes can use different solvents.

Alternatively or in combination, the residual curable material can be removed by heating the object and/or applying a vacuum to the object. In such embodiments, the component(s) to be removed can have a sufficiently low molecular weight to facilitate removal via boiling, evaporation, and/or sublimation, as described above. Optionally, the component(s) to be removed can initially have a higher molecular weight, and can subsequently be converted to a lower molecular weight component via degradation induced by light (e.g., breaking of a photodimer into smaller molecules via light), heating (e.g., a reverse Diels-Alder reaction via heat), solvents, other chemicals, etc. In such embodiments, the degradation process can be performed before the material removal process and/or concurrently with the material removal process.

Optionally, after the residual curable material has been removed, additional post-processing of the object can be performed. For example, the object can undergo post-curing, e.g., as described above with respect to block 106 of FIG. 1. The energy used for post-curing can be the same type of energy used in block 304, or can be a different type of energy. Post-curing can increase the degree of curing, cause phase changes (e.g., phase condensation), cause annealing, etc., which in turn can further tune the material properties of the object (e.g., increase the modulus, $T_g$, etc.). Additionally, post-curing can reduce or eliminate the reactivity of any residual curable material that was not removed (e.g., monomers), which can be beneficial for reducing toxicity. In some embodiments, residual curable material that is not removed before post-curing may become incorporated into the polymer network during post-curing, which may reduce or eliminate any differences in modulus that would otherwise be observed. For instance, post-curing may cause any low molecular weight components still present to become incorporated into the polymer network. Accordingly, it may be beneficial or necessary to extract at least 80%, 90%, 95%, 99%, or 99.9% of any residual curable material that is intended to be removed before post-curing the object. In other embodiments, however, post-curing is not performed. For example, post-curing may be omitted if the material properties of the green state object are already sufficient for the intended use (e.g., if the modulus, $T_g$, etc., are already above a predetermined threshold value).

As another example, in embodiments where the residual curable material was removed using a solvent, the post-processing of the object can include removing the solvent (e.g., at least 90%, 95%, 98%, 99%, or 99.9% of the solvent), such as by exposing the object to heat and/or vacuum for sufficient time to remove the solvent. In some embodiments, the solvent removal process takes no more than 24 hours, 12 hours, 6 hours, 4 hours, 2 hours, 1 hour, 30 minutes, 10 minutes, 5 minutes, 2 minutes, or 1 minutes. In a further example, the post-processing of the object can include any of the following: removing supports and/or other sacrificial components, mechanical trimming, cleaning, polishing, washing, rinsing with additional solvents, applying coatings and/or surface treatments, and/or infusing active compounds (e.g., pharmaceuticals, fragrances).

The amount of material removed from a particular object portion can be varied as desired using the techniques described herein. For example, the amount of material removed from an object portion can be less than or equal to 5%, 10%, 20%, 30%, 40%, 50%, 60%, 70%, 80%, 90% or 95% of the residual curable material initially present in the object portion. Alternatively or in combination, the amount of material removed can be at least 5%, 10%, 20%, 30%, 40%, 50%, 60%, 70%, 80%, 90% or 95% of the residual curable material initially present in the object portion. The amount of material removed can be within a range from 10% to 80%, 10% to 50%, 30% to 80%, or 1% to 60% of the residual curable material initially present in the object portion. In embodiments where the object geometry is defined using coordinates (e.g., pixels or voxels), each coordinate can be programmed for the removal of a different amount of material, based off of the maximum amount of material that can be removed for that particular material. For instance, the amount of material removed can be programmed to be at least 5%, 10%, 20%, 30%, 40%, 50%, 60%, 70%, 80%, 90%, 95%, 99%, or 99.9% of the maximum amount of material that can be removed.

Figure 4B:
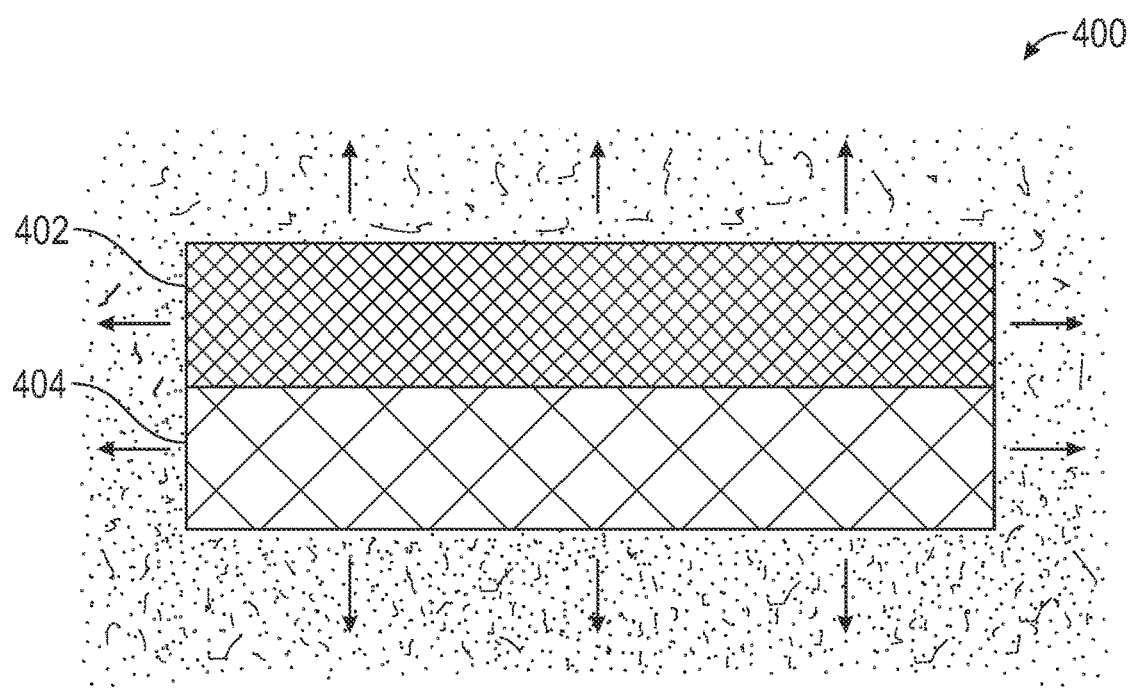
FIG. 4B is a schematic illustration of material removal from the object of FIG. 4A.

For example, FIG. 4B is a schematic illustration of material removal from the object 400, in accordance with embodiments of the present technology. The amount of material removed from the first object portion 402 can be different than the amount of material removed from the second object portion 404. For example, the amount of material removed from the first object portion 402 can be less than or equal to 1%, 5%, 10%, 20%, 30%, 40%, 50%, 60%, 70%, 80%, or 90% of the amount of material removed from the second object portion 404.

Referring again FIG. 3, after the material removal process of block 306, the method 300 can further include assessing the amount of material removed from one or more object portions, or from the entire object. The amount of material removed can be determined using any suitable technique, such as based on changes in weight, absorbance, reflectance, density, refractive index, color; using FTIR spectroscopy, Raman spectroscopy; etc. This determination can be used to confirm whether the object was fabricated according to specifications, e.g., for quality control purposes.

Figure 4C:
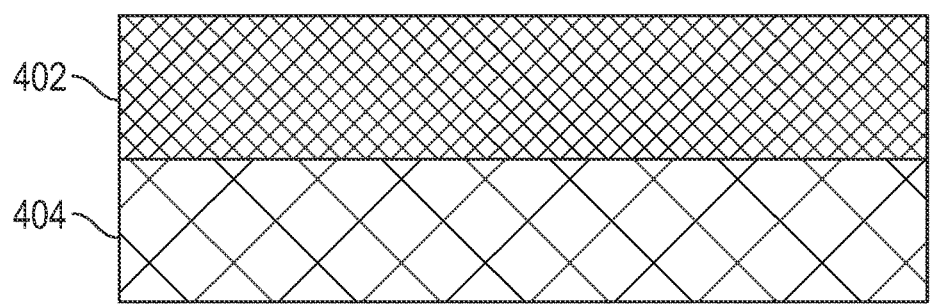
FIG. 4C is a schematic illustration of the object of FIG. 4A after material removal.

After the residual curable material has been removed, different portions of the object can exhibit different material properties, depending on the amount of material removed from each object portion. For example, FIG. 4C is a schematic illustration of the object 400 after material removal, in accordance with embodiments of the present technology. After the material removal (e.g., before and/or after post-curing), the first object portion 402 can have a first modulus (e.g., elastic modulus, flexural modulus, and/or storage modulus), and the second object portion 404 can have a second modulus less than the first modulus. The first modulus (e.g., at room temperature (such as 20° C. or 25° C.) and/or 37° C.) can be at least 100 MPa, 200 MPa, 300 MPa, 400 MPa, 500 MPa, 600 MPa, 700 MPa, 800 MPa, 900 MPa, or 1000 MPa; and the second modulus (e.g., at room temperature (such as 20° C. or 25° C.) and/or 37° C.) can be no more than 900 MPa, 800 MPa, 700 MPa, 600 MPa, 500 MPa, 400 MPa, 300 MPa, 200 MPa, 100 MPa. The first modulus can be at least 50 MPa, 100 MPa, 150 MPa, 200 MPa, 250 MPa, 300 MPa, 350 MPa, 400 MPa, 450 MPa, or 500 MPa greater than the second modulus. Alternatively or in combination, the first object portion 402 can have a first $T_g$, and the second object portion 404 can have a second $T_g$ less than the first $T_g$. The first $T_g$ can be at least 50° C., 75° C., 80° C., 100° C., 125° C., 150° C., 175° C., or 200° C.; and the second Tg can be no more than 175° C., 150° C., 125° C., 100° C., 80° C., or 75° C. The first $T_g$ can be at least 5° C., 10° C., 15° C., 20° C., 25° C., 30° C., 35° C., 40° C., 45° C., or 50° C. greater than the second $T_g$.

Figure 4D:
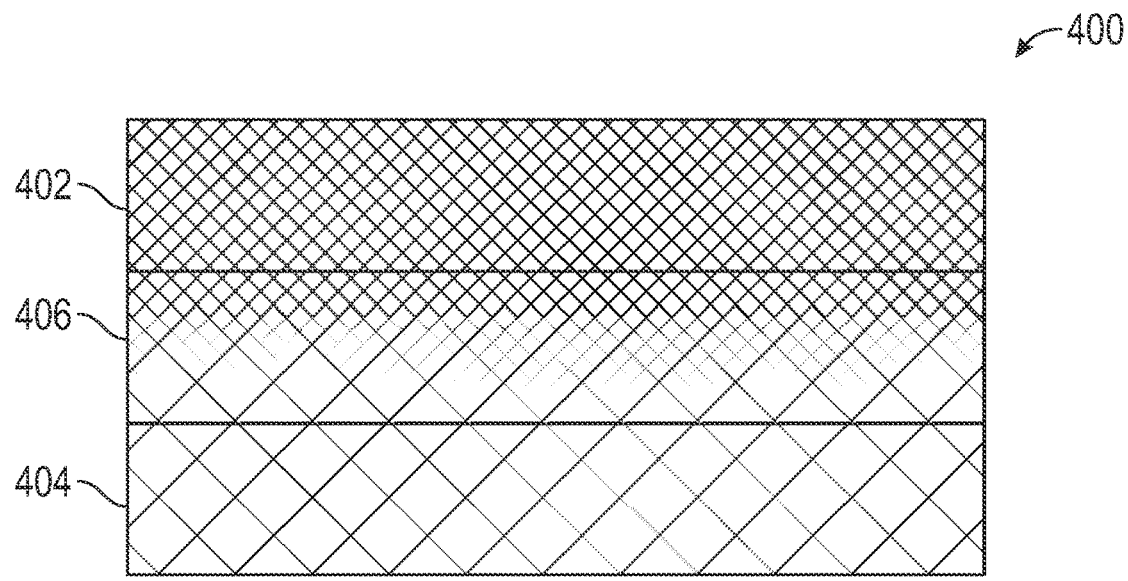
FIG. 4D is a schematic illustration of an object including a third object portion with gradated properties, in accordance with embodiments of the present technology.

Optionally, as shown in FIG. 4D, the object 400 can include a third object portion 406 between the first object portion 402 and the second object portion 404. In some embodiments, the third object portion 406 exhibits gradated properties. Specifically, the properties of the third object portion 406 can be as follows: (1) at locations adjacent or near the first object portion 402, the properties of the third object portion 406 are the same or similar to the properties of the first object portion 402; (2) at locations adjacent or near the second object portion 404, the properties of the third object portion 406 are the same or similar to the properties of the second object portion 404; and (3) at the center of the third object portion 406 away from the first object portion 402 and the second object portion 404, the third object portion 406 has intermediate properties between the properties of the first object portion 402 and the second object portion 404. The gradated properties of the third object portion 406 can be created passively (e.g., via chemical processes such as diffusion of resin components) and/or can be created actively (e.g., by varying the energy dosage and/or other energy application parameters when forming the third object portion 406 to create the gradient). Optionally, the gradated properties of the third object portion 406 can be created when an energy wavelength used to cure the first object portion 402 also produces partial curing of the third object portion 406.

Referring again to FIG. 3, the number and spatial configuration of the object portions having different material properties can be varied in many ways, depending on the desired function of the object. For example, in embodiments where the object is an orthodontic appliance configured to be worn in a patient's mouth, the different object portions can correspond to different portions of the appliance. As another example, in embodiments where the object includes a functional component (e.g., a component intended to be in the final product) and a sacrificial component (e.g., a component not intended to be in the final product, such as a support), the first object portion can be or include the functional component, and the second object portion can be or include the sacrificial component. Optionally, the object portions can be arranged in one or more patterns, such as lattices, stripes, stitches, zigzags, gradients, etc. The geometry and locations of the pattern(s) can be varied as desired. For instance, a pattern can be designed to spread out stress over a larger portion of the object, transfer stress from one portion of the object to another portion of the object, and/or reduce stress concentration by avoiding sharp transitions between properties.

In some embodiments, the material properties of the object after the residual curable material has been removed (e.g., with and/or without post-curing) are configured such that the object exhibits little or no deformation (e.g., warping, bending, shrinkage) after fabrication, and the object geometry before material removal is substantially the same as the object geometry after material removal. For example, in embodiments where the object is an orthodontic appliance intended to be worn on the teeth, the object can be configured to exhibit substantially no deformation at room temperature (e.g., 20° C. or 25° C.) and/or under physiological conditions (e.g., 37° C., in contact with physiological fluids) in order to maintain the desired force distribution on the teeth. Optionally, the object can exhibit some elastic deformation, but little or no plastic deformation, at room temperature and/or under physiological conditions. In other embodiments, the object can exhibit deformation under certain circumstances, as described in greater detail below. As another example, in embodiments where the object will undergo mechanically intensive post-processing (e.g., centrifugation to remove residual resin), the object can be configured to exhibit sufficient rigidity to avoid being damaged during post-processing. Accordingly, after the material removal process, and before and/or after post-curing, some or all of the portions of the object can exhibit one or more of the following material properties: a $T_g$ of at least 50° C., 75° C., 80° C., 100° C., 125° C., 150° C., 175° C., or 200° C.; a modulus (e.g., elastic modulus, flexural modulus, and/or storage modulus) of at least 100 MPa, 200 MPa, 300 MPa, 400 MPa, 500 MPa, 600 MPa, 700 MPa, 800 MPa, 900 MPa, or 1000 MPa; and/or an elongation to break (e.g., measured at 1.7 mm/min at room temperature (such as 20° C. or 25° C.) and/or at 37° C.) of at least 40%, 50%, 60%, 70%, 80%, 90%, 100%, 120%, 150%, 200%, 300%, 400%, or 500%.

Alternatively or in combination, some or all of the object portions may exhibit deformation after fabrication, but can be symmetrically arranged so as to limit any overall deformation of the object due to different degrees of swelling, shrinkage, etc. For example, some or all of the object portions can be arranged to be symmetric about one or more of the following axes: a vertical axis, a horizontal axis, a mesial-distal axis, a buccal-lingual axis, and/or an occlusal-gingival axis.

In some embodiments, the amount of deformation exhibited by a particular object portion is predictable (e.g., based on experimental data, simulations, machine learning models). Accordingly, the instructions for fabricating the object (e.g., the three-dimensional model) can be adjusted to compensate for the predicted deformation, such that the final object geometry after deformation substantially matches the intended object geometry.

Optionally, after fabrication, the object can be configured to react to external stimuli (e.g., a solvent, light, heat) to change in geometry, color, clarity, hardness, etc., based on the heterogeneous material properties of the object. For example, the object can include some "soft" object portions that are less dense, less stiff, and/or more hydrophilic than other "hard" object portions. When placed in water, the object can change shape based on the swelling of the soft object portions relative to the hard object portions. This approach can be used to implement 4D printing.

The method 300 can be varied in many different ways. In some embodiments, for example, the method 300 can include additional processes not shown in FIG. 3. For instance, the method 300 can optionally include performing minor post-processing after the process of block 304 and before the process of block 306, such as the removal of supports, cleaning of material from the object, solvent washing, annealing the object, etc. In some embodiments, this minor post-processing does not remove significant amounts of residual curable material from the object (e.g., less than 10%, 5%, 2%, or 1% of the residual curable material). In another example, the method 300 can also include post-curing and/or other post-processing after the process of block 306, as previously described.

As yet another example, the method 300 can include programming the amount of material to be removed using another energy application process different from the energy application process of block 304. The energy used to program the removal of material can be different from the energy used to form the object. In such embodiments, the process of block 304 can include applying a first energy (e.g., a first energy wavelength, a first energy type) to the curable material to form the object. Concurrently or sequentially, a second energy (e.g., a second wavelength of light, a second energy type) can be applied to at least one object portion. The second energy can alter a local characteristic of the object portion that selectively affects (e.g., increases or decreases) the amount of material removed from the object portion relative to the remaining object portions. For example, the second energy can interact with a photoacid generator present in the curable material to produce acids that selectively degrade the object portion, thus allowing more residual material to be removed. Similar approaches can be used with photobase generators, selective heating during curing, and/or other types of energy deposition, as discussed elsewhere herein. Additional examples of processes in which the energy used to form the object is different from the energy used to program material removal are described in detail below in connection with FIGS. 5-6B.

Additionally, although the method 300 is described herein with respect to a single object, the method 300 can be used to produce any suitable number of objects, such as tens, hundreds, or thousands of objects. In such embodiments, some or all of the objects can have customized geometries and/or spatial distributions of material properties. For example, in embodiments where the objects are orthodontic appliances, each object can be customized for a particular patient and/or a particular treatment stage for the patient.

Figure 5:
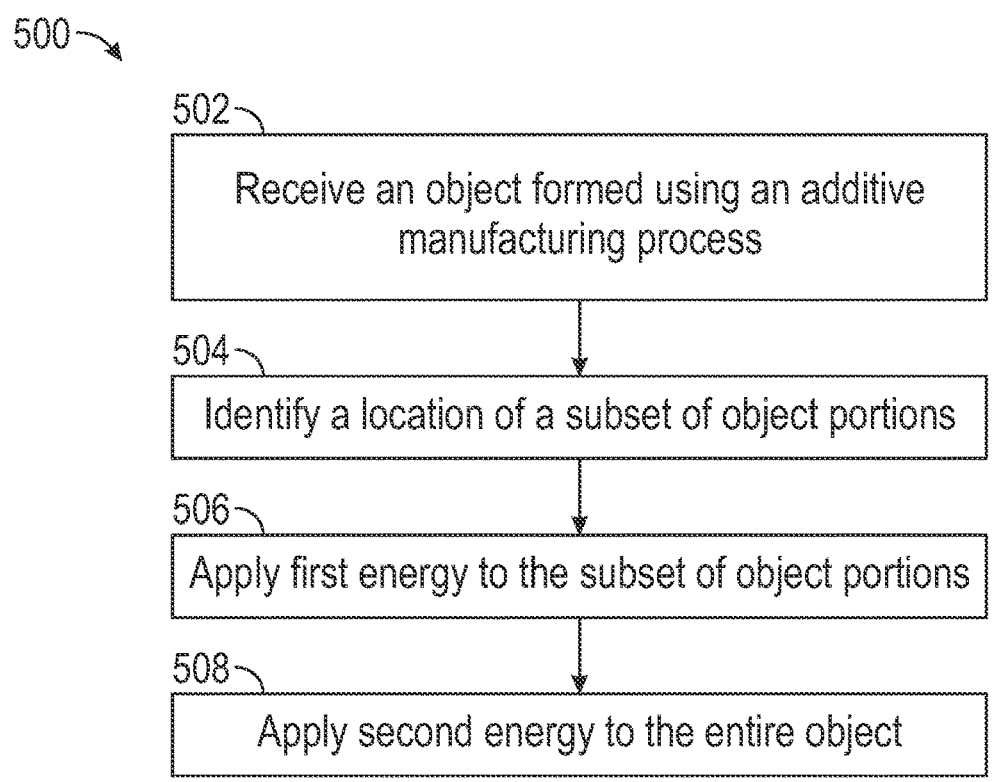
FIG. 5 is a flow diagram illustrating another method for producing an object having heterogeneous properties, in accordance with embodiments of the present technology.

FIG. 5 is a flow diagram illustrating another method 500 for producing an object having heterogeneous properties, in accordance with embodiments of the present technology. The method 500 can be performed using any suitable system or device, such as the embodiments described below in connection with FIGS. 6A and 6B. In some embodiment, some or all of the processes of the method 500 are implemented as computer-readable instructions (e.g., program code) that are configured to be executed by one or more processors of a computing device. The method 500 can be combined with any of the other methods described herein, such as the method 100 of FIG. 1 and/or the method 300 of FIG. 3.

The method 500 begins at block 502 with receiving an object formed using an additive manufacturing process. The object can be an orthodontic appliance, such as an aligner, palatal expander, retainer, attachment placement device, etc. The additive manufacturing process can implement any of the techniques described elsewhere herein, such as DLP, SLA, etc. For example, the additive manufacturing process can involve applying energy to a curable material to form an object, in accordance with block 102 of FIG. 1 and/or block 304 of FIG. 3. Any suitable type of energy can be used, such as electromagnetic energy, acoustic energy, and/or radiation energy. The energy can cause a change in the curable material to build up the object geometry, such as chemical reactions, melting, coalescing, hardening, solidifying, etc. In some embodiments, the object is formed from a single type of curable material (e.g., a single vat of starting material for a vat-based process). The object can be in a green state before any post-curing has occurred, or can be in a post-cured state. Optionally, the object can have already undergone some minor post-processing, such as removal of supports, cleaning of material from the object, solvent washing, etc.

In some embodiments, the additive manufacturing process involves forming an object having heterogeneous material properties by using applied energy to program material removal, as previously described with respect to the method 300 of FIG. 3. In such embodiments, the object produced in block 502 can already include a plurality of object portions having different material properties, and the subsequent processes of the method 500 can be used to further enhance existing differences in material properties and/or create new object portions with different material properties. In other embodiments, however, the object produced in block 502 can have substantially homogeneous material properties, such that the subsequent processes of the method 500 are used to selectively alter the material properties of certain portions of the object.

At block 504, the method 500 continues with identifying a location of a subset of object portions. The additively manufactured object can include a plurality of object portions, such as two, three, four, five, six, seven, eight, nine, 10, 20, 30, 40, 50, or more object portions. For example, as described elsewhere herein, the object portions can correspond to different portions of an orthodontic appliance, functional or sacrificial components of the object, etc. The process of block 504 can include selecting a subset of the object portions whose material properties are to be adjusted, also referred to herein as "targeted object portions." For example, the selected subset can include at least two, three, four, five, six, seven, eight, nine, 10, 20, 30, 40, 50, or more targeted object portions. The object can optionally include some object portions whose material properties are intended to remain substantially unaffected, also referred to herein as "remaining object portions." In some embodiments, the object includes at least one, two, three, four, five, six, seven, eight, nine, 10, 20, 30, 40, 50, or more remaining object portions. Alternatively, the object may not include any remaining object portions.

In some embodiments, the targeted object portions are identified using at least one sensor configured to obtain sensor data of the object. The sensor(s) can include one or more of the following sensor types: imaging devices (e.g., cameras, scanners), distance sensors (e.g., ultrasonic sensors, time-of-flight sensors, rangefinders), or combinations thereof. The sensor(s) can generate sensor data representing the location of each targeted object portion on or within the object. For example, in embodiments where the sensor(s) include an imaging device, the imaging device can generate two-dimensional and/or three-dimensional image data of the object geometry. Fiduciary marks can be located on the object and/or on a substrate (e.g., build platform) supporting the object to facilitate identification of the object and/or the targeted object portion.

The sensor data generated by the sensor(s) can be analyzed to identify the locations of the targeted object portions. For example, image data can be analyzed via computer vision techniques, trained machine learning models, etc., to determine the locations of the targeted object portions relative to the locations of the remaining object portions. In some embodiments, the identification process includes comparing the sensor data to a digital representation of the object. The digital representation can be a three-dimensional model of the object that includes location information for the targeted object portions and/or the remaining object portions. Optionally, the digital representation can be or include a digital data set representing a target distribution of material properties for the object. For instance, the digital data set can include location information for an object portion (e.g., a set of coordinates defining the geometry of the object portion), and one or more desired material properties for that object portion.

In some embodiments, the object has a customized geometry (e.g., for a particular patient and/or for a particular treatment stage), such that the locations of the targeted object portions may vary from object to object. In such embodiments, the process of block 504 can further include receiving an identifier for the object using at least one sensor, and then identifying the locations of the targeted object portions based on the identifier. For example, the identifier can be received from a label, tag (e.g., RFID tag), code (e.g., barcode), etc., that is associated with the object (e.g., embedded in or attached to the object, embedded in or attached to a substrate or other structure supporting the object). The identifier can then be used to retrieve a digital representation depicting the customized geometry of the object, which can be used to identify the locations of the targeted object portions as described above. In other embodiments, however, some or all of the objects can have a uniform (e.g., standard) geometry, such that the locations of the targeted object portions are the same or similar from object to object.

At block 506, the method 500 includes applying first energy to the subset of object portions (the targeted object portions). The first energy can be configured to modify at least one material property of the targeted object portions. For example, the first energy can cause heating, melting, coalescing, degrading, hardening, softening, chemical reactions (e.g., chemical bond formation, chemical bond breaking), changes in morphology, changes in phase (e.g., amorphous to crystalline, crystalline to amorphous), and/or other changes that affect the material properties.

The first energy can be any suitable energy type, such as electromagnetic energy, acoustic energy, and/or radiation energy. In some embodiments, the first energy includes electromagnetic energy (e.g., UV, infrared, or visible light) that produces photoreactions (e.g., dimerization, isomerization, cleavage, catalyst generation) that alter the material properties of the targeted object portion. The wavelength of the electromagnetic energy can be selected based on the material composition of the targeted object portions. For example, the wavelength can be in the UV range to produce photocuring of the targeted object portion. As another example, the wavelength can be in the infrared range to produce thermal curing and/or pre-heating of the targeted object portion. In a further example, the wavelength can be configured to initiate a reverse photodimerization reaction to break bonds within the targeted object portion. The first energy can be the same energy type used in the additive manufacturing process to form the object, or can be a different type of energy.

Examples of material properties that can be modified by the first energy include, but are not limited to, any of the following: modulus (e.g., storage modulus), $T_g$, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, and/or durability. For example, the first energy can be configured to increase or decrease a modulus of a targeted object portion by at least 10%, 20%, 30%, 40%, 50%, 60%, 70%, 80%, 90%, 100%, 120%, 150%, 200%, 300%, 400%, or 500%. The first energy can increase or decrease the modulus of the targeted object portion by at least 50 MPa, 100 MPa, 150 MPa, 200 MPa, 250 MPa, 300 MPa, 350 MPa, 400 MPa, 450 MPa, or 500 MPa. Alternatively or in combination, the first energy can be configured to increase or decrease a $T_g$ of the targeted object portion by at least 10%, 20%, 30%, 40%, 50%, 60%, 70%, 80%, 90%, 100%, 120%, 150%, 200%, 300%, 400%, or 500%. The first energy can increase or decrease the $T_g$ of the targeted object portion by at least 5° C., 10° C., 15° C., 20° C., 25° C., 30° C., 35° C., 40° C., 45° C., or 50° C.

In some embodiments, the first energy changes one or more local characteristics of the targeted object portions (e.g., degree of curing, crosslink density, phase, crystallinity, morphology, permeability, solubility, viscosity, swellability, reactivity, degradability, porosity, particle connectivity, surface area, melting point), which in turn affect the material properties of the targeted object portions. For instance, the first energy can increase the degree of curing of the targeted object portions, such as by promoting bond formation (e.g., polymerization) between one or more reactive components of the targeted object portions, which in turn can increase the modulus and/or $T_g$ of the targeted object portions. Conversely, the first energy can decrease the degree of curing of the targeted object portions, such as by promoting bond breaking (e.g., depolymerization, degradation, dedimerization) within a polymer network of the targeted object portions, which in turn can decrease the modulus and/or $T_g$ of the targeted object portions.

Optionally, the first energy can affect the material properties of the targeted object portions by changing one or more local characteristics that enhance or reduce material removal, as previously described herein with respect to the method 300 of FIG. 3. In such embodiments, the process of block 506 can further include removing the material from the targeted object portions (e.g., via solvent, heating, vacuum) using the techniques discussed above in connection with FIG. 3.

In some embodiments, the object includes a plurality of targeted object portions that are intended to have different material properties. The material properties of a particular object portion can correlate to the energy application parameters of the first energy used to treat that object portion. Accordingly, some or all of the targeted object portions can be treated using different energy application parameters (e.g., different energy intensities, dosages, exposure times, wavelengths, and/or energy types) in order to produce the desired spatial distribution of material properties. For example, the object can include a first targeted object portion treated using a first set of energy application parameters (e.g., a first energy dosage), a second targeted object portion treated using a second set of energy application parameters different from the first set (e.g., a second energy dosage), a third targeted object portion treated using a third set of energy application parameters different from the first and second sets (e.g., a third energy dosage), etc., as previously described in connection with the method 300 of FIG. 3.

In some embodiments, the first energy is selectively applied to the targeted object portions only. Accordingly, the remaining object portions can exhibit little or no change in material properties after the process of block 506. In such embodiments, the first energy can be applied by at least one energy source that is spatially controlled to avoid exposing the remaining object portions to the first energy. Examples of suitable configurations for the energy source(s) are described below in connection with FIGS. 6A and 6B.

At block 508, the method 500 optionally includes applying second energy to the entire object. The second energy can be configured to post-cure the entire object, including the targeted object portions and the remaining object portions, in order to further develop the material properties of the entire object. The second energy can include any suitable energy type, such as electromagnetic energy, acoustic energy, and/or radiation energy. The second energy can be the same energy type as the first energy, or can be a different type of energy. In some embodiments, the second energy is the same energy type as the first energy, but is applied using different parameters (e.g., a different intensity, dosage, exposure time, and/or wavelength). For example, the second energy can be applied using a lower intensity, dosage, and/or exposure time than the first energy. As another example, the second energy can have a different wavelength than the first energy, which can cause the penetration depth of the second energy to differ from the penetration depth of the first energy, as described herein. In other embodiments, however, block 508 is optional and can be omitted, e.g., if the object is already in a post-cured step when received at block 502.

In some embodiments, the material properties of the final object (e.g., with and/or without post-curing) are configured such that the object exhibits little or no deformation (e.g., warping, bending, shrinkage) after fabrication, as previously described with respect to the method 300 of FIG. 3. Accordingly, after the process of block 506 and/or the process of block 508, some or all of the portions of the object can exhibit one or more of the following material properties: a $T_g$ of at least 50° C., 75° C., 80° C., 100° C., 125° C., 150° C., 175° C., or 200° C.; a modulus (e.g., elastic modulus, flexural modulus, and/or storage modulus) of at least 100 MPa, 200 MPa, 300 MPa, 400 MPa, 500 MPa, 600 MPa, 700 MPa, 800 MPa, 900 MPa, or 1000 MPa; and/or an elongation to break (e.g., measured at 1.7 mm/min at room temperature and/or at 37° C.) of at least 40%, 50%, 60%, 70%, 80%, 90%, 100%, 120%, 150%, 200%, 300%, 400%, or 500%. Alternatively or in combination, some or all of the object portions may exhibit deformation after fabrication, but can be symmetrically arranged to limit any overall deformation of the object, and/or the object geometry can be adjusted to compensate for any predicted deformation, as previously described with respect to the method 300 of FIG. 3. Optionally, after fabrication, the object can be configured to controllably deform or otherwise react to external stimuli, as previously described with respect to the method 300 of FIG. 3.

The method 500 can be varied in many different ways. In some embodiments, for example, the method 500 can include additional processes not shown in FIG. 5. For instance, the method 500 can optionally include performing minor post-processing before the process of block 502, after the process of block 502 and before the process of block 504, and/or after the process of block 506 and before the process of block 508. Such minor post-processing can include the removal of supports, cleaning of material from the object, solvent washing, etc. In another example, the method 500 can also include post-processing after the process of block 508, such as applying surface treatments, polishing, washing, etc.

Additionally, although the method 500 is described herein with respect to a single object, the method 500 can be used to produce any suitable number of objects, such as tens, hundreds, or thousands of objects. In such embodiments, some or all of the objects can have customized geometries and/or spatial distributions of material properties. For example, in embodiments where the objects are orthodontic appliances, each object can be customized for a particular patient and/or a particular treatment stage for the patient. Accordingly, the method 500 can be repeated multiple times for different objects, with the energy application being tailored to the particular geometry of each object.

Figure 6A:
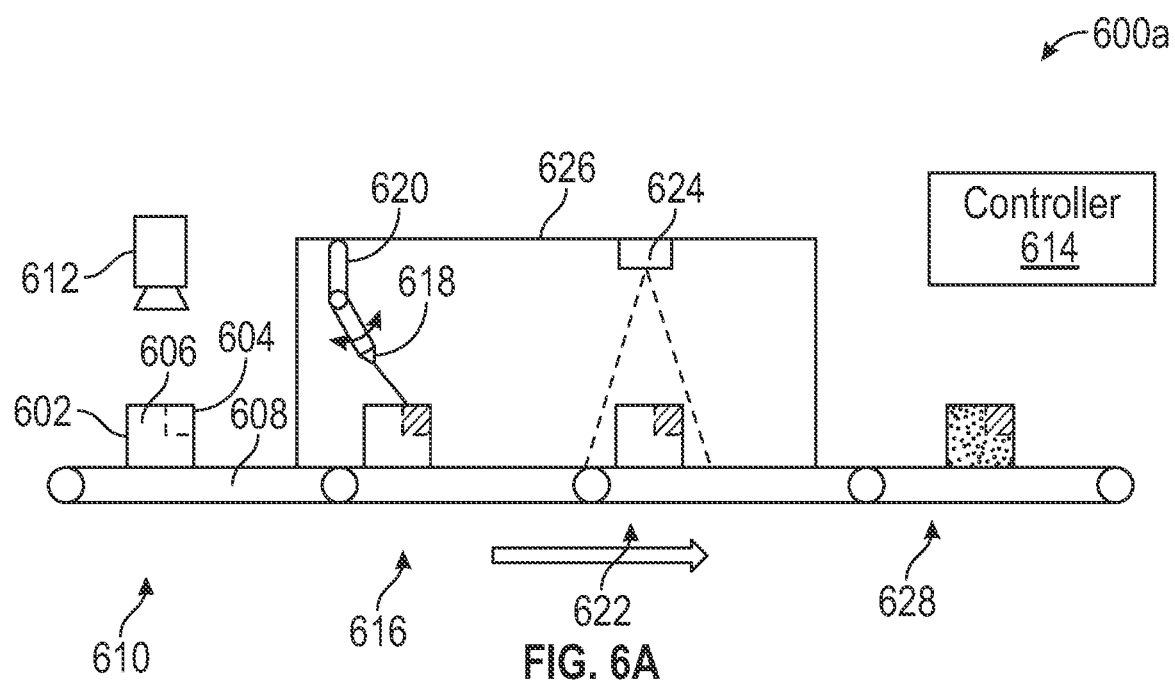
FIG. 6A is a partially schematic illustration of a system for producing an object with heterogeneous properties, in accordance with embodiments of the present technology.

FIG. 6A is a partially schematic illustration of a system 600a for producing an object 602 with heterogeneous properties, in accordance with embodiments of the present technology. The system 600a can be used to implement any of the methods described herein, such as the method 500 of FIG. 5.

The object 602 can include a plurality of object portions, such as a first object portion 604 and a second object portion 606. When received by the system 600a, the object 602 can be in an initial (e.g., green) state in which the first and second object portions 602, 604, have the same or similar material properties. The first object portion 604 can be intended to have a different set of material properties than the second object portion 606 in the final (e.g., post-cured) state of the object 602.

The object 602 can be received from an additive manufacturing system (not shown) and positioned on a conveyer belt 608 (or other suitable mechanism) configured to transport the object 602 through the various sections of the system 600a. The object 602 can be placed on the conveyer belt 608 in a random position and/or orientation, or can be placed in a predetermined position and/or orientation. For example, in embodiments where the object 602 is fabricated in a known position and/or orientation on a substrate (e.g., a build platform), the substrate can be placed on the conveyer belt 608 in a predetermined arrangement so that the position and/or orientation of the object 602 relative to the components of the system 600a is known.

In some embodiments, the conveyer belt 608 first transports the object 602 to a sensing zone 610 adjacent or near at least one sensor 612. The sensor 612 (e.g., an imaging device) can be configured to generate sensor data (e.g., images) of the object 602. The sensor 612 can be operably coupled to a controller 614 (e.g., a computing device) that analyzes the sensor data to identify the location of the first object portion 604 in the object 602, as previously described.

In some embodiments, the sensor 612 has a sufficiently large field of view so the entire object 602 can be imaged without moving the object 602 and or sensor 612. Alternatively, the object 602 can be moved relative to the sensor 612, the sensor 612 can be moved relative to the object 602, or a combination thereof. Additionally, although the embodiment of FIG. 6A includes a single sensor 612, in other embodiments, the system 600a can include multiple sensors 612, such as two, three, four, five, 10, 20, or more sensors 612. In embodiments where multiple sensors 612 are used, some or all of the sensors 612 can be different sensor types, and/or some or all of the sensors 612 can be positioned at different locations relative to the object 602.

Subsequently, the conveyer belt 608 can transport the object 602 to a first treatment zone 616 adjacent or near a first energy source 618 (e.g., a laser). The first energy source 618 can be configured to apply first energy targeted to the first object portion 604 in order to selectively modify the material properties of the first object portion 604, in accordance with the techniques described above with respect to the method 500 of FIG. 5. For example, in the embodiment of FIG. 6A, the first energy source 618 is coupled to an actuatable device 620 (e.g., a robotic arm or gimbal) that allows the first energy source 618 to be moved to a plurality of different poses (e.g., positions and/or orientations) relative to the object 602. In such embodiments, the controller 614 can determine a pose of the first energy source 618 such that the first energy targets the first object portion 604 and not the second object portion 606. The controller 614 can cause the actuatable device 620 to move the first energy source 618 into the determined pose, and then activate the first energy source 618 to apply the first energy to the first object portion 604. Alternatively or in combination, the object 602 can be moved to a plurality of different poses relative to the first energy source 618. For example, the controller 614 can control the conveyer belt 608 to reposition the object 602 so that the first object portion 604 is within the output range of the first energy source 618, and the second object portion 606 is outside the output range of the second energy source 624.

Subsequently, the conveyer belt 608 can transport the object 602 to a second treatment zone 622 adjacent or near a second energy source 624 (e.g., a UV lamp). The second energy source 624 can be configured to apply second energy to the entire object 602, including both the first object portion 604 and the second object portion 606, in order to adjust the material properties of the entire object 602. For example, the second energy source 624 can be configured to post-cure the object 602, as previously described with respect to the method 500 of FIG. 5.

In some embodiments, the conveyer belt 608 then transports the object 602 to an output zone 628 where additional post-processing can occur, such as trimming, applying surface treatments, polishing, washing, etc. The object 602 can then be prepared for packaging and use.

The controller 614 can be or include a computing device including one or more processors and memory storing instructions for controlling the operations of the system 600a. For example, the controller 614 can be operably coupled to the conveyer belt 608 to control the movement speed and/or movement direction of the conveyer belt 608. The controller 614 can also be operably coupled to the sensor 612 to transmit instructions to the sensor 612 (e.g., instructions for obtaining sensor data of the object) and to receive sensor data generated by the sensor 612. The controller 614 can also be operably coupled to the first energy source 618, and/or second energy source 624 to control the energy application parameters used, such as the energy intensity, dosage, exposure time, wavelength, etc.

The system 600a of FIG. 6A can be modified in many different ways. For example, although the system 600a is shown as including a single chamber 626 containing both the first energy source 618 and a second energy source 624, in other embodiments, the first energy source 618 can be located in a first chamber, and the second energy source 624 can be located in a second, separate chamber. Additionally, although FIG. 6A illustrates a single sensor 612, first energy source 618, and second energy source 624, in other embodiments, the system 600a can include any suitable number of sensors 612, first energy sources 618, and/or second energy sources 624. Moreover, the system 600a can include components not shown in FIG. 6A, such as at least one additional sensor configured to monitor the object 602 at the first treatment zone 616, second treatment zone 622, and/or output zone 628 to generate feedback indicating whether the applied energy had the desired result (e.g., whether the first object portion 604 was sufficiently cured by the first energy from the first energy source 618, whether the object 602 was sufficiently cured by the second energy from the second energy source 624, whether any off-target curing occurred). Optionally, some of the components of the system 600a can be omitted, such as the second energy source 624.

Figure 6B:
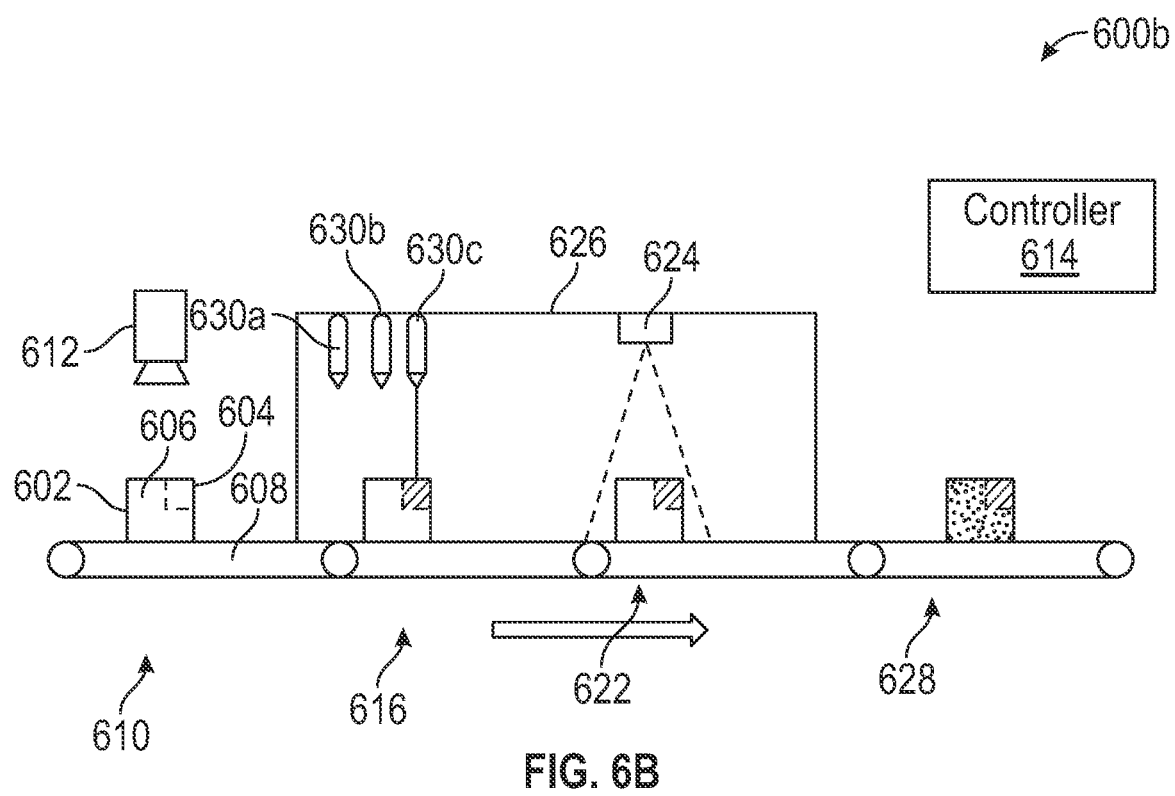
FIG. 6B is a partially schematic illustration of another system for producing an object with heterogeneous properties, in accordance with embodiments of the present technology.

FIG. 6B is a partially schematic illustration of another system 600b for post-curing an object 602, in accordance with embodiments of the present technology. The system 600b can be generally similar to the system 600a of FIG. 6A, except that the first treatment zone 616 includes a plurality of first energy sources 630a-630c. The first energy sources 630a-630c can be stationary and in a fixed position and/or orientation relative to the object 602. Each of the first energy sources 630a-630c can be configured to output energy along a different direction. In such embodiments, the controller 614 can be configured to identify one or more of the first energy sources 630a-630c that output energy in a direction toward the first object portion 604, and can activate only those sources in order to selectively apply energy to the first object portion 604.

Although FIG. 6B illustrates three first energy sources 630a-630c, in other embodiments, the system 600b can include a different number of first energy sources, such as two, four, five, 10, or more. Optionally, some or all of the first energy sources 630a-630c can be movable to further improve targeting of the first object portion 604.

Figure 7A:
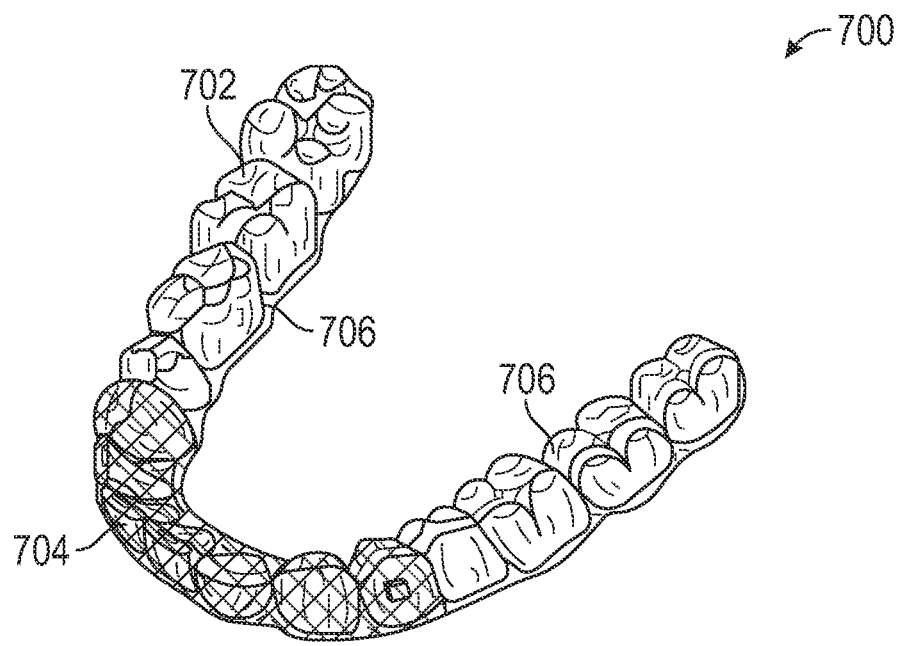
FIG. 7A is a perspective view of an orthodontic appliance having heterogeneous properties, in accordance with embodiments of the present technology.

The present technology can be used to produce many different types of objects having heterogeneous properties. For example, FIG. 7A is a perspective view of an orthodontic appliance 700 ("appliance 700") having heterogeneous properties, in accordance with embodiments of the present technology. In the illustrated embodiment, the appliance 700 includes shell 702 having a plurality of teeth-receiving cavities configured to reposition one or more teeth. In the illustrated embodiment, the appliance 700 includes a first portion 704 having a first set of material properties, and a second portion 706 having a second, different set of material properties. The first and second portions 704, 706 can be fabricated using any of the systems and methods described herein.

In FIG. 7A, the first portion 704 is a mesial portion of the appliance and the second portion 706 is a distal portion of the appliance. In other embodiments, the first and second portions 704, 706 can each be independently selected from any of the following appliance portions: a portion adjacent or near one or more teeth, a portion spaced apart from one or more teeth, a portion adjacent or near the palate, a portion adjacent or near an attachment, an outer portion, an inner portion, a distal portion, a mesial portion, an occlusal portion, a gingival portion, an interproximal portion, a buccal portion, a lingual portion, and/or suitable combinations thereof. Additionally, in other embodiments, the appliance 700 can include additional portions fabricated with different material properties, such as three, four, five, 10, 20, or more portions having different material properties.

For example, portions of an appliance adjacent or near an interproximal region of the teeth can have different properties than other portions of the appliance to provide improved tooth repositioning forces. In some embodiments, interproximal regions of the appliance have increased stiffness and/or strength compared to the remaining regions of the appliance, since the interproximal regions may be more susceptible to fracture due to stress concentration when the appliance is placed on and/or removed from the patient's tooth. Alternatively, the interproximal regions of the appliance can have reduced stiffnesses compared to the remaining regions of the appliance, e.g., to reduce stress concentration.

As another example, portions of an appliance configured to engage an attachment on a tooth can have different properties than other portions of the appliance to enhance control over the force exerted on the tooth via the attachment. In a further example, in embodiments where the appliance 700 is fabricated with a plurality of supports (not shown) for additive manufacturing, the appliance 700 can have different material properties than the supports. In some embodiments, reverse photodimerization is used to mechanically weaken the supports to make it easier to remove the appliance 700 from the supports during post-processing.

Figure 7B:
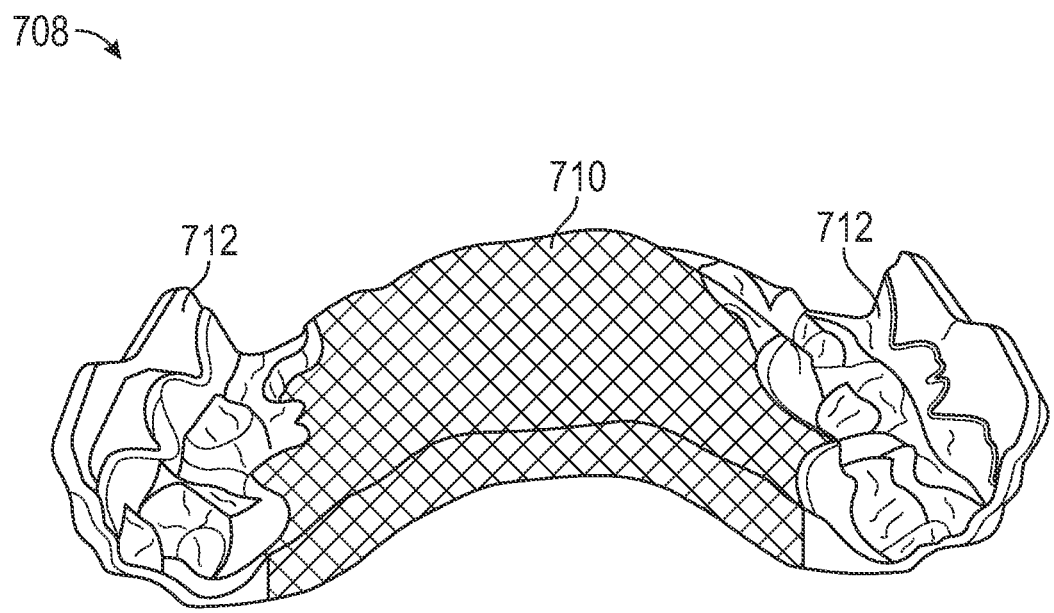
FIG. 7B is a perspective view of a palatal expander having heterogeneous properties, in accordance with embodiments of the present technology.

FIG. 7B is a perspective view of a palatal expander 708 having heterogeneous properties, in accordance with embodiments of the present technology. The palatal expander 708 (also referred to herein as a "palate expander" or an "arch expander") is another type of orthodontic appliance that can be produced using the techniques described herein. The palatal expander 708 includes an expander portion 710 configured to be positioned near a patient's palate, and a teeth engaging portion 712 coupled to opposite sides of the expander portion 710 and including a plurality of teeth-receiving cavities. During use, the expander portion 710 can apply forces against teeth at the opposite sides of the patient's mouth to cause the patient's palate to expand.

In some embodiments, the expander portion 710 has different material properties than the teeth engaging portion 712, e.g., the expander portion 710 can have a higher modulus, $T_g$, and/or strength than the teeth engaging portion 712 in order to apply sufficient forces to widen the palate. This configuration can be achieved using any of the methods described herein. For example, the expander portion 710 can be selectively preheated, cured, and/or post-cured to enhance the mechanical properties of the expander portion 710 relative to the teeth engaging portion 712.

Figure 7C:
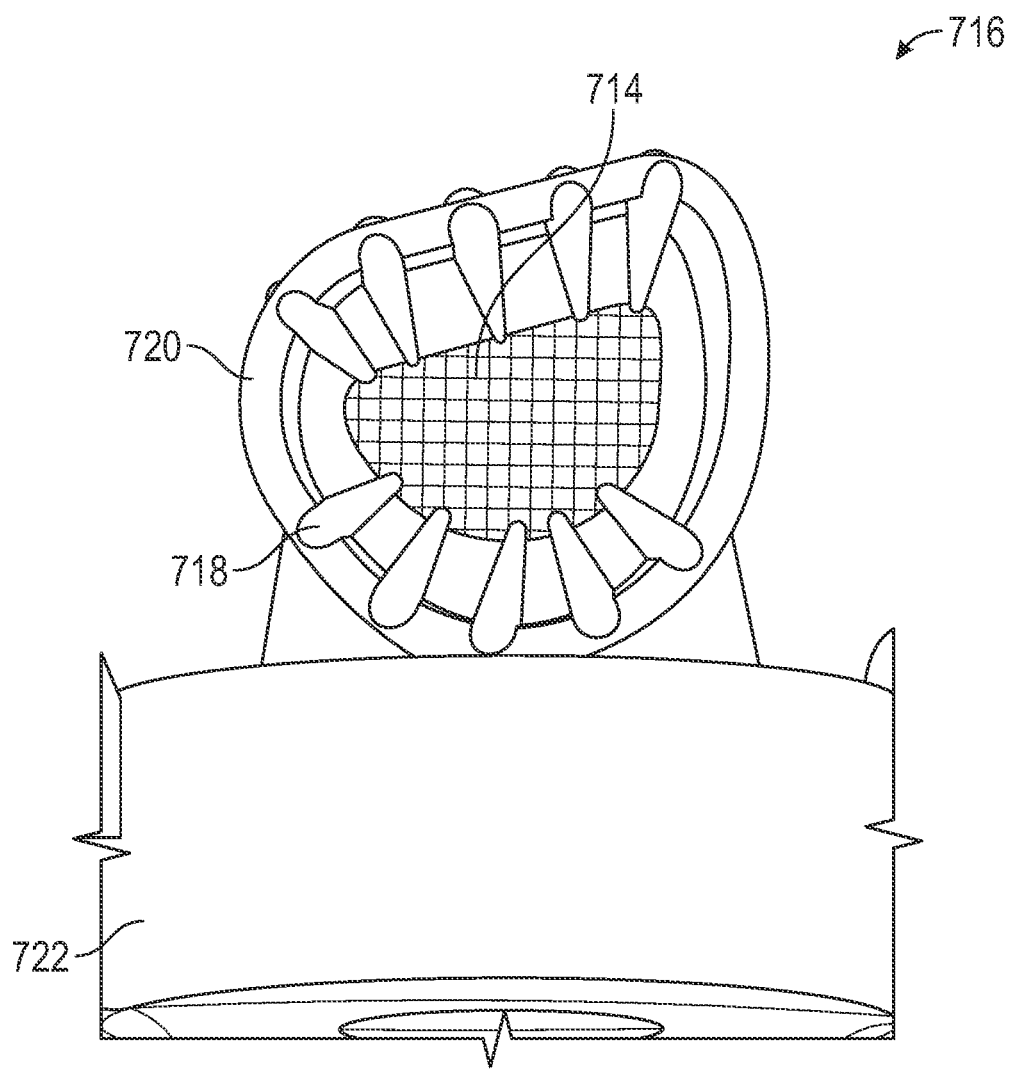
FIG. 7C is a perspective view of an attachment placement device having heterogeneous properties, in accordance with embodiments of the present technology.

FIG. 7C is a perspective view of an attachment 714 of an attachment placement device having heterogeneous properties, in accordance with embodiments of the present technology. The attachment 714 can be considered to be a type of orthodontic appliance in that it can be used in conjunction with another device (e.g., the appliance 700 of FIG. 7A) to apply force to a patient's tooth. In the illustrated embodiment, the attachment 714 is attached to a sacrificial structure 716 configured to support the attachment 714 during manufacturing and/or post-processing. The sacrificial structure 716 can include a plurality of elongate supports 718 (e.g., struts) coupled to the attachment 714, a frame 720 coupled to the supports 718 and surrounding the attachment 714, and a base 722 coupled to the frame 720. This configuration can be beneficial to facilitate manufacturing, post-processing, and/or handling of a relatively small attachment 714.

In some embodiments, the sacrificial structure 716 is part of an attachment placement device configured to position the attachment 714 at a predetermined location on a patient's tooth. In such embodiments, the base 722 can be shaped to couple to the patient's tooth so that the attachment 714 is adjacent to the tooth at the desired location. The attachment 714 can then be coupled to the tooth surface, and the supports 718 can be separated from the attachment 714 to allow the attachment placement device to be removed while leaving the attachment 714 in place.

In some embodiments, the attachment 714 has different material properties than the sacrificial structure 716. For example, the attachment 714 may require a higher mechanical strength and can therefore be selectively cured with a higher energy intensity. Conversely, the sacrificial structure 716 may require less mechanical strength but more flexibility for durability and/or handling, and can therefore be selectively cured with a lower energy intensity.

Although the embodiments of FIGS. 7A-7C depict appliances with relatively large areas of uniform material properties, the techniques herein can be used to create different patterns of material properties, such as gradients, lattices, stripes, stitches, zigzags, etc. The geometry and location of the patterned properties can be varied as desired. For instance, the pattern can be designed to spread out stress over a larger portion of the appliance, transfer stress from one portion of the appliance to another portion of the appliance, and/or reduce stress concentration by avoiding sharp transitions between properties.

III. Dental Appliances and Associated Methods

Figure 8A:
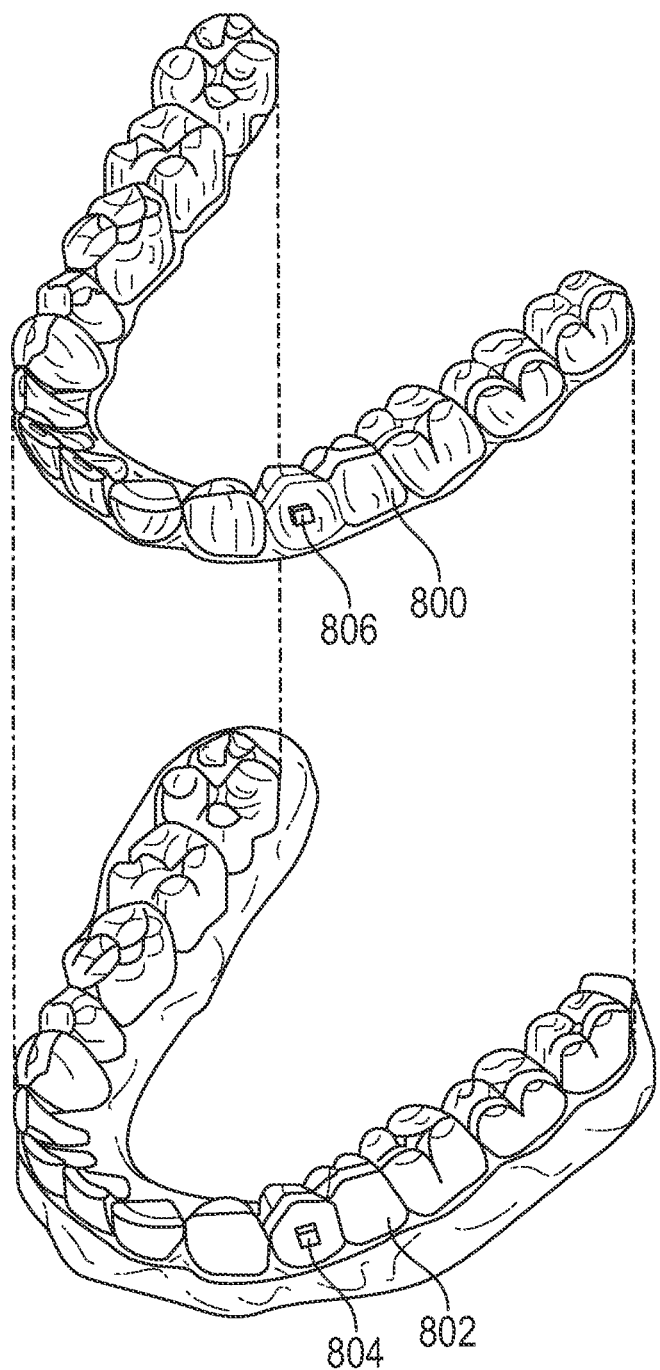
FIG. 8A illustrates a representative example of a tooth repositioning appliance configured in accordance with embodiments of the present technology.

FIG. 8A illustrates a representative example of a tooth repositioning appliance 800 configured in accordance with embodiments of the present technology. The appliance 800 can be manufactured and post-processed using any of the systems, methods, and devices described herein. The appliance 800 (also referred to herein as an "aligner") can be worn by a patient in order to achieve an incremental repositioning of individual teeth 802 in the jaw. The appliance 800 can include a shell (e.g., a continuous polymeric shell or a segmented shell) having teeth-receiving cavities that receive and resiliently reposition the teeth. The appliance 800 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 800 can fit over all teeth present in an upper or lower jaw, or less than all of the teeth. The appliance 800 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 800 can be a generic appliance configured to receive the teeth, but not necessarily shaped to match the topography of the patient's teeth. In some cases, only certain teeth received by the appliance 800 are repositioned by the appliance 800 while other teeth can provide a base or anchor region for holding the appliance 800 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 800 in place over the teeth. In some cases, however, it may be desirable or necessary to provide individual attachments 804 or other anchoring elements on teeth 802 with corresponding receptacles 806 or apertures in the appliance 800 so that the appliance 800 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 8B:
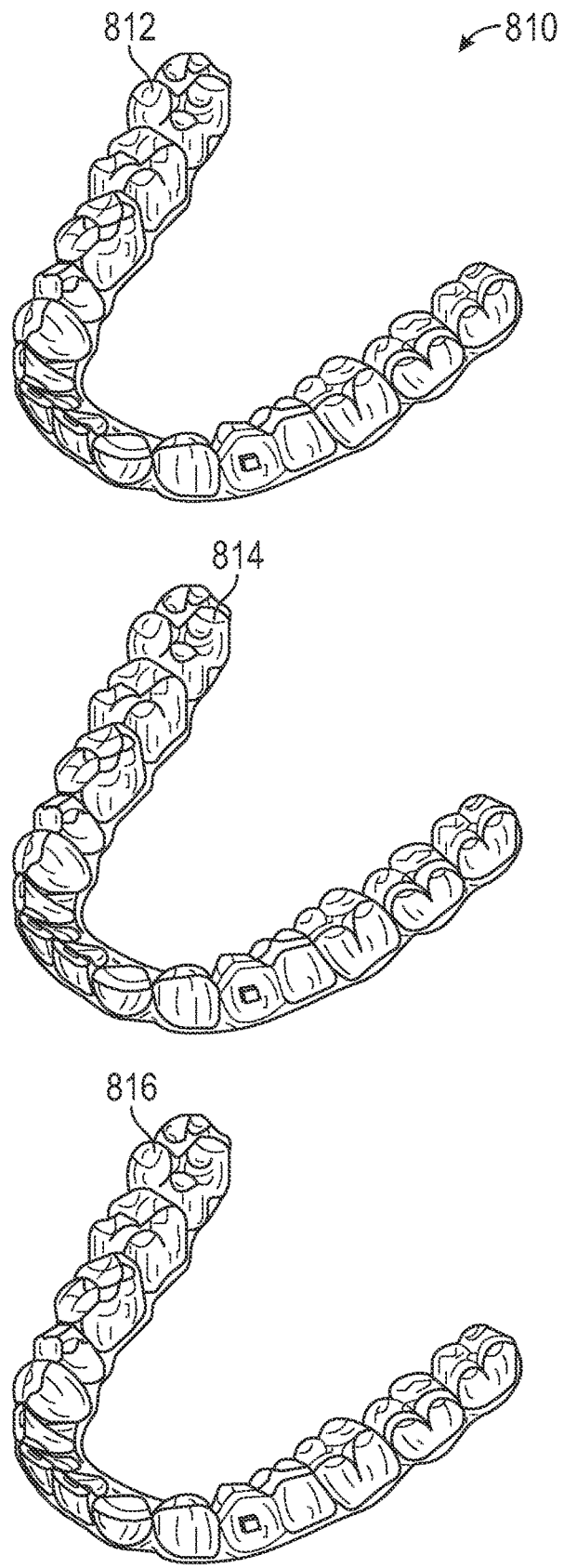
FIG. 8B illustrates a tooth repositioning system including a plurality of appliances, in accordance with embodiments of the present technology.

FIG. 8B illustrates a tooth repositioning system 810 including a plurality of appliances 812, 814, 816, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 810 can include a first appliance 812 corresponding to an initial tooth arrangement, one or more intermediate appliances 814 corresponding to one or more intermediate arrangements, and a final appliance 816 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 8C:
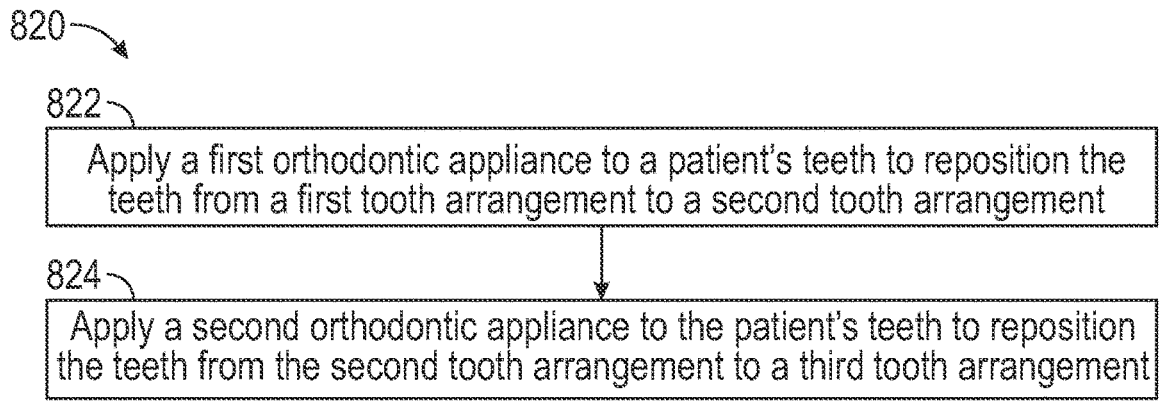
FIG. 8C illustrates a method of orthodontic treatment using a plurality of appliances, in accordance with embodiments of the present technology.

FIG. 8C illustrates a method 820 of orthodontic treatment using a plurality of appliances, in accordance with embodiments of the present technology. The method 820 can be practiced using any of the appliances or appliance sets described herein. In block 822, a first orthodontic appliance is applied to a patient's teeth in order to reposition the teeth from a first tooth arrangement to a second tooth arrangement. In block 824, a second orthodontic appliance is applied to the patient's teeth in order to reposition the teeth from the second tooth arrangement to a third tooth arrangement. The method 820 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 9:
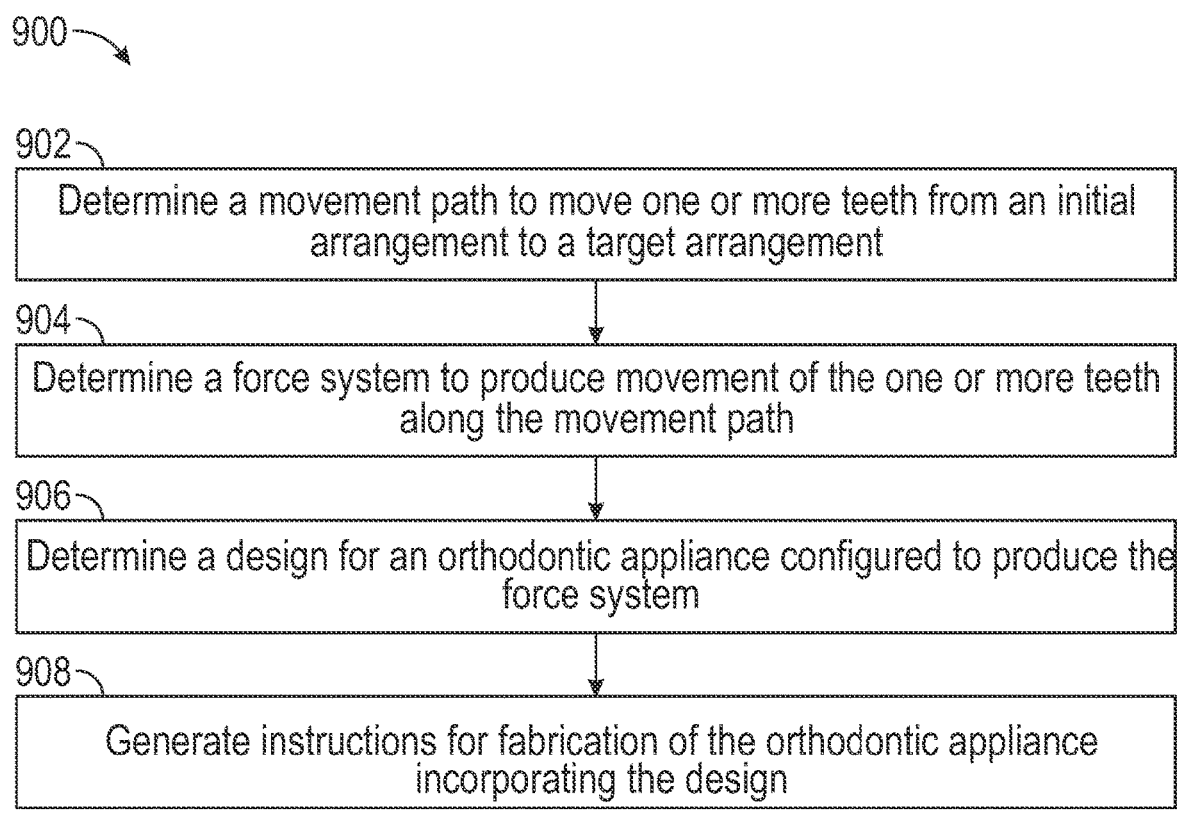
FIG. 9 illustrates a method for designing an orthodontic appliance, in accordance with embodiments of the present technology.

FIG. 9 illustrates a method 900 for designing an orthodontic appliance, in accordance with embodiments of the present technology. The method 900 can be applied to any embodiment of the orthodontic appliances described herein. Some or all of the steps of the method 900 can be performed by any suitable data processing system or device, e.g., one or more processors configured with suitable instructions.

In block 902, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 904, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 906, a design for an orthodontic appliance configured to produce the force system is determined. The design can include the appliance geometry, material composition, and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systemes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 908, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 900 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 900 may be performed with any suitable fabrication system or device, such as the embodiments described herein. Some of the steps may be optional, and the order of the steps can be varied as desired.

Figure 10:
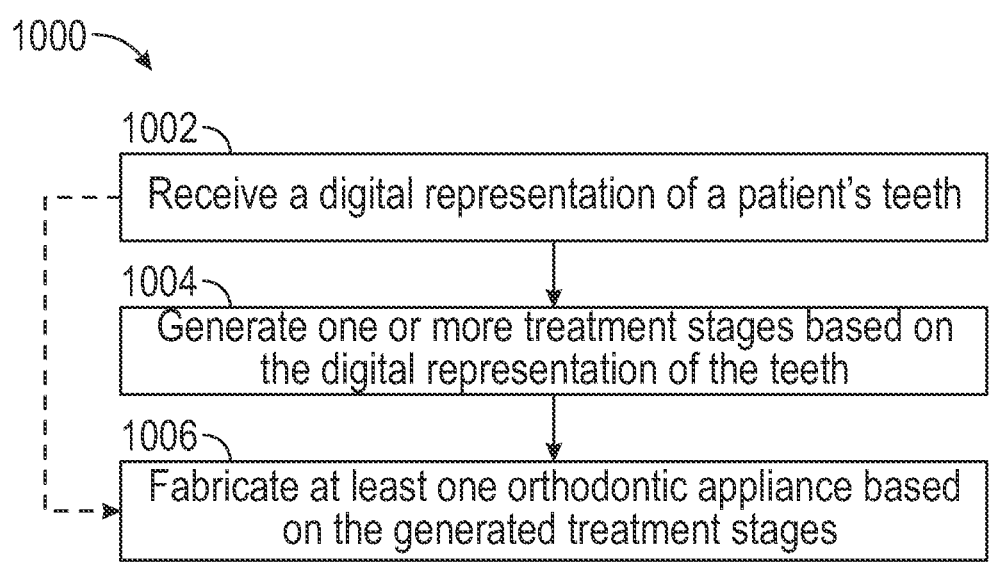
FIG. 10 illustrates a method for digitally planning an orthodontic treatment and/or design or fabrication of an appliance, in accordance with embodiments of the present technology.

FIG. 10 illustrates a method 1000 for digitally planning an orthodontic treatment and/or design or fabrication of an appliance, in accordance with embodiments. The method 1000 can be applied to any of the treatment procedures described herein and can be performed by any suitable data processing system.

In block 1002 a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1004, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1006, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 10, design and/or fabrication of an orthodontic appliance, and perhaps a particular orthodontic treatment, may include use of a representation of the patient's teeth (e.g., including receiving a digital representation of the patient's teeth (block 1002)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537, 406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement devices, e.g., appliances used to position pre-fabricated attachments on a person's teeth in accordance with one or more aspects of a treatment plan. Examples of attachment placement devices (also known as "attachment placement templates" or "attachment fabrication templates") can be found at least in: U.S. application Ser. No. 17/249,218, entitled, "Flexible 3D Printed Orthodontic Device," filed Feb. 24, 2021; U.S. application Ser. No. 16/366,686, entitled, "Dental Attachment Placement Structure," filed Mar. 27, 2019; U.S. application Ser. No. 15/674,662, entitled, "Devices and Systems for Creation of Attachments," filed Aug. 11, 2017; U.S. Pat. No. 11,103, 330, entitled, "Dental Attachment Placement Structure," filed Jun. 14, 2017; U.S. application Ser. No. 14/963,527, entitled, "Dental Attachment Placement Structure," filed Dec. 9, 2015; U.S. application Ser. No. 14/939,246, entitled, "Dental Attachment Placement Structure," filed Nov. 12, 2015; U.S. application Ser. No. 14/939,252, entitled, "Dental Attachment Formation Structures," filed Nov. 12, 2015; and U.S. Pat. No. 9,700,385, entitled, "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled, "Releasable Palatal Expanders," filed Apr. 10, 2019; U.S. application Ser. No. 16/022,552, entitled, "Devices, Systems, and Methods for Dental Arch Expansion," filed Jun. 28, 2018; U.S. Pat. No. 11,045,283, entitled, "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled, "Methods and Apparatuses for Customizing a Rapid Palatal Expander," filed Dec. 4, 2017; and U.S. Pat. No. 7,192,273, entitled, "System and Method for Palatal Expansion," filed Aug. 7, 2003; all of which are incorporated by reference herein in their entirety.

EXAMPLES

The following examples are included to further describe some aspects of the present technology, and should not be used to limit the scope of the technology.

Example 1: Mechanical Properties of Samples Manufactured with Different Energy Dosages This example describes the mechanical properties of samples manufactured with different energy dosages via DLP. The resin formulation included: (1) a monofunctional methacrylate-based reactive diluent having a low molecular weight and high $T_g$; (2) an oligomeric crosslinker with four functional groups having a Mw of approximately 2 kDa and a low $T_g$; (3) an oligomeric crosslinker with four functional groups having a high molecular weight and a low $T_g$; (4) a photoinitiator, and (5) a UV blocker. 50 mm×4 mm×1 mm rectangular samples were printed in an xzy print orientation using a Cubicure Caligma DLP printer at a wavelength of 365 nm and a print temperature of 60° C. Sample 1 was printed using a 3/3 DLP energy dosage ("all white"), corresponding to a light intensity of 45 mW/cm² and an exposure time of 1 second. Sample 2 was printed using a 1/3 DLP energy dosage ("all gray"), corresponding to a light intensity of 45 mW/cm² and an exposure time of 1/3 second. After printing, green state samples were soaked for 10 minutes in isopropyl alcohol, air dried overnight, dried for 2 hours at 60° C., then UV post-cured for 10 minutes at 385 nm with an intensity of 100 mW/cm². The samples were then subjected to mechanical testing using a TA Instruments DMA Q850 dynamic mechanical analyzer with a three-point bending setup with 5% strain. The samples were submerged in water at 37° C. during testing.

Figure 11:
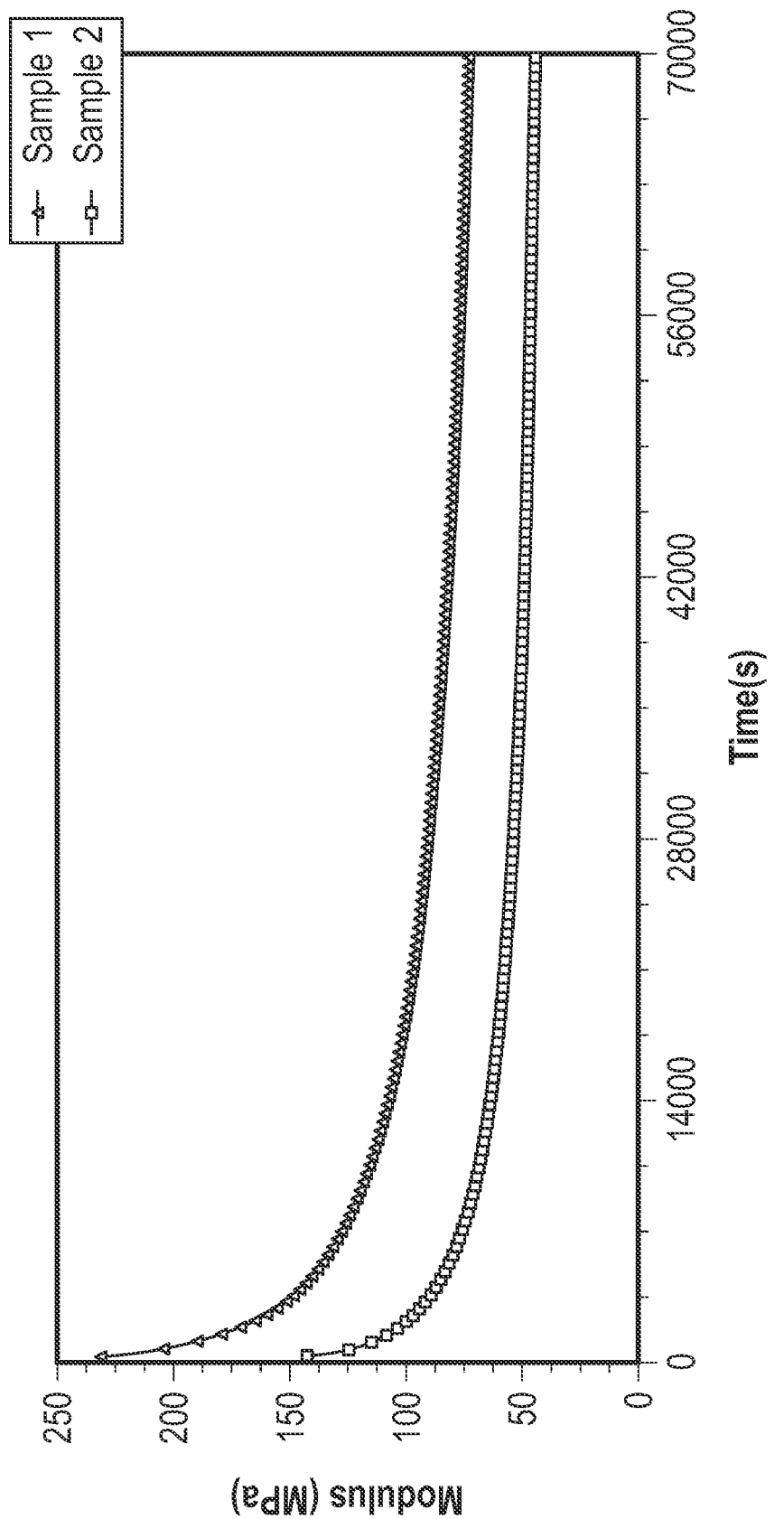
FIG. 11 is a graph illustrating mechanical testing results for samples manufactured with different energy dosages.

FIG. 11 is a graph illustrating the stress-relaxation curves at 5% strain obtained for Sample 1 (triangles) and Sample 2 (squares). Sample 1 had a storage modulus of 920 MPa at 37° C.; Sample 2 had a storage modulus of 710 MPa at 37° C. (approximately 30% lower than the storage modulus of Sample 1). It is hypothesized that the lower energy dosage used to print Sample 2 reduced the DBC of Sample 2 compared to Sample 1, thus allowing more of the reactive diluent to be removed from Sample 2 during the isopropyl alcohol soak. Since the reactive diluent had the highest polymer modulus of all the formulation components, the storage modulus of Sample 2 after post-processing was therefore lower than that of Sample 1.

Example 2: Mechanical Properties of Multilayered Samples

This example describes the mechanical properties of a multilayered sample manufactured via grayscaled DLP patterning.

Figure 12A:
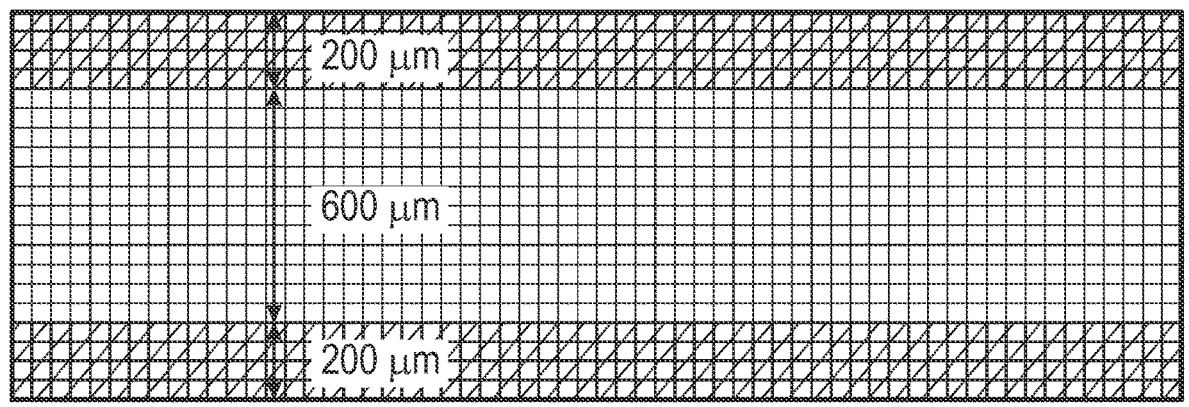
FIG. 12A is a side view of a multilayered sample.

FIG. 12A is a side view of the structure of Sample 3. The dimensions of Sample 3 were 50 mm×4 mm×1 mm. Sample 3 included three layers: two 200 μm outer layers printed using a 1/3 DLP energy dosage ("gray pixels"), and a 600 μm inner layer printed using a 3/3 DLP energy dosage ("white pixels"). The resin formulation and print protocol were the same as previously described in Example 1 above.

Figure 12B:
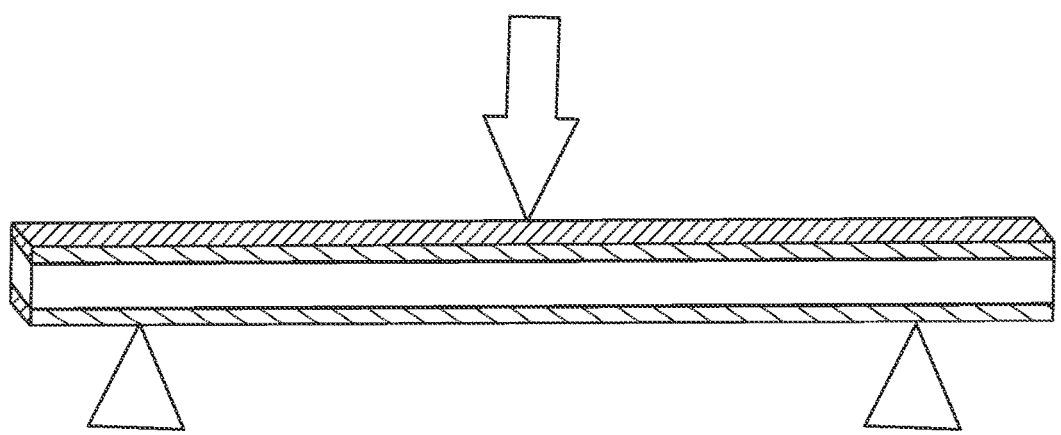
FIG. 12B illustrates an experimental setup for three-point bend testing.

FIG. 12B illustrates the experimental setup for three-point bend testing of Sample 3. Testing was performed at 37° C. in water using the protocol described in Example 1 above.

Figure 12C:
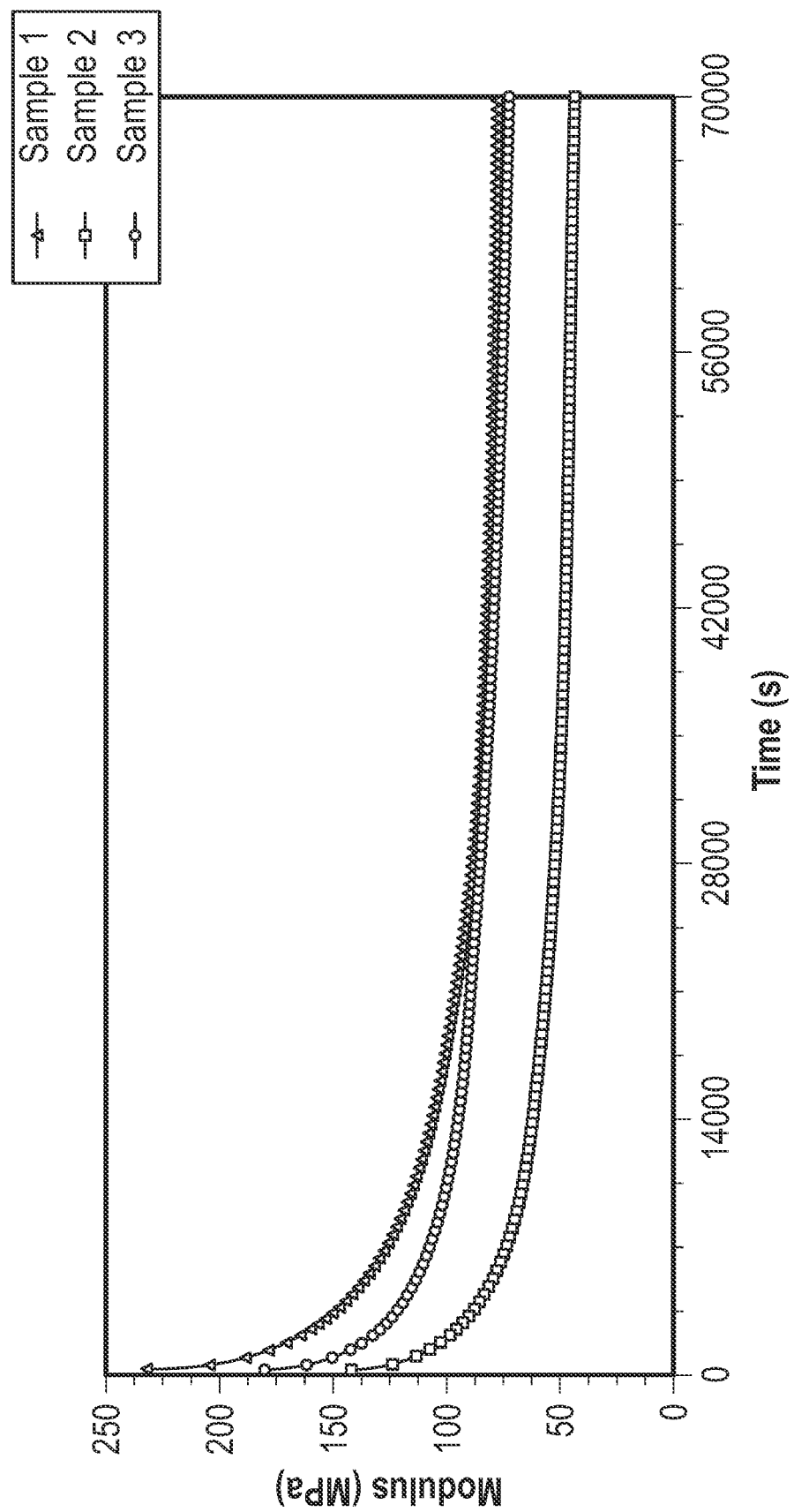
FIG. 12C is a graph illustrating mechanical testing results for a multilayered sample compared to single layer samples.

FIG. 12C is a graph illustrating the stress-relaxation curves at 5% strain for Sample 1 (triangles), Sample 2 (squares), and Sample 3 (circles). The initial modulus of Sample 3 (multilayered) was higher than that of Sample 2 (all gray) and lower than that of Sample 1 (all white).

Example 3; Sugar-Based Formulation for Manufacturing Objects with Heterogeneous Properties This example describes a sugar-based formulation for manufacturing an object with heterogeneous properties.

Sugar is mixed with a high molecular weight amphiphilic monomer, oligomeric photoinitiators, and water-soluble light blockers. The formulation is used to fabricate a layered printed object using SLA. The object geometry includes an outer sphere and an inner cube within the outer sphere. The outer sphere is formed with a 50% light dosage, and the inner cube is formed with a 100% light dosage. After printing, the object is placed in water for a predetermined time that corresponds to preferential dissolution of the sugar from the outer sphere. After drying and post-curing with sufficient light to fully react the remaining monomers, the inner cube contains more sugar than the outer sphere, resulting in differences in modulus, flavor, color, transparency, and other attributes. The object can also exhibit varied responses during later use. For instance, if the object is placed back in water, the outer sphere can control the rate of water diffusion into the inner cube. Thus, after long time periods, the inner cube can swell with water to create an internal osmotic pressure and/or can slowly release the sugar to the outer sphere and surrounding water.

Additional Examples

Additional examples of aspects of the present technology are described below as numbered clauses (1, 2, 3, etc.) for convenience. These are provided as examples and do not limit the subject technology.
1. A method comprising:
    receiving a digital data set representing a dental appliance;
    applying energy to a curable material based on the digital data set to form the dental appliance, wherein the dental appliance includes at least two appliance portions formed from the curable material using different energy application parameters; and
    removing residual curable material from the dental appliance, wherein a different amount of the residual curable material is removed from each of the at least two appliance portions, and wherein, after the residual curable material is removed, the at least two appliance portions each have different material properties, and the at least two appliance portions each have one or more of (1) a glass transition temperature of at least 80° C. or (2) a modulus of at least 200 MPa.

2. The method of Clause 1, wherein the at least two appliance portions include a first appliance portion and a second appliance portion, and the different energy application parameters are selected to enhance removal of the residual curable material from the first appliance portion compared to the second appliance portion.

3. The method of Clause 1, wherein the at least two appliance portions include a first appliance portion and a second appliance portion, and the different energy application parameters are selected to reduce removal of the residual curable material from the first appliance portion compared to the second appliance portion.

4. The method of any one of Clauses 1-3, wherein removing the residual curable material from the dental appliance comprises one or more of the following: exposing the dental appliance to a solvent, applying heat to the dental appliance, or applying a vacuum to the dental appliance.

5. The method of any one of Clauses 1-4, wherein the residual curable material comprises residual monomers, residual oligomers, or a combination thereof.

6. The method of any one of Clauses 1-5, wherein the different energy application parameters comprise a difference in one or more of the following: energy intensity, energy dosage, exposure time, energy wavelength, or energy type.

7. The method of any one of Clauses 1-6, wherein the different energy application parameters cause the at least two appliance portions to differ from each other with respect to one or more of the following: degree of curing of the curable material, crosslink density, phase, crystallinity, morphology, permeability, solubility, viscosity, swellability, reactivity, degradability, porosity, particle connectivity, surface area, or melting point.

8. The method of any one of Clauses 1-7, wherein the different material properties of the at least two appliance portions result from the different amounts of the residual curable material removed from each of the at least two appliance portions.

9. The method of any one of Clauses 1-8, wherein the different material properties comprise a difference in one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.

10. The method of any one of Clauses 1-9, wherein the curable material comprises a resin.

11. The method of any one of Clauses 1-10, wherein the dental appliance is formed from a single type of curable material.

12. The method of any one of Clauses 1-11, wherein the energy is applied to the curable material according to an additive manufacturing process.

13. A method comprising:
    receiving a digital data set representing a dental appliance;
    applying energy to a curable material based on the digital data set to form the dental appliance, wherein the dental appliance includes at least two appliance portions formed using different energy application parameters; and
    removing residual curable material from the dental appliance by exposing the dental appliance to a solvent,
        wherein the solvent is selected to infiltrate differently into the at least two appliance portions such that a different amount of the residual curable material is removed from each of the at least two appliance portions, and
        wherein, after the residual curable material is removed, the at least two appliance portions each have different material properties.

14. The method of Clause 13, wherein the at least two appliance portions include a first appliance portion and a second appliance portion, and the different energy application parameters are selected to enhance infiltration of the solvent into the first appliance portion compared to the second appliance portion.

15. The method of Clause 13, wherein the at least two appliance portions include a first appliance portion and a second appliance portion, and the different energy application parameters are selected to reduce infiltration of the solvent into from the first appliance portion compared to the second appliance portion.

16. The method of any one of Clauses 13-15, wherein the solvent comprises one or more of acetic acid, acetone, acetonitrile, ammonia, benzene, butanol, butyl acetate, camphor, carbon tetrachloride, chloroform, cyclohexanone, diethyl ether, dimethylformamide, dimethylsulfoxide, dioxane, ethanol, ethyl acetate, ethyl cellosolve, ethyl lactate, ethylene glycols, eugenol, glycerin, heptanes, hexanes, isoamyl acetate, isopropyl acetate, isopropyl alcohol, liquid or low melting sugars, low melting or high melting waxes, menthol, methanol, methylene chloride, phenols, propanol, propylene carbonate, propylene glycols, pressurized gases, silicone oils, soapy water, supercritical carbon dioxide, tetrahydrofuran, toluene, triacetin, turpentine, vanillin, vegetable oils, water, or xylene.

17. The method of any one of Clauses 13-16, wherein the residual curable material comprises residual monomers, residual oligomers, or a combination thereof.

18. The method of any one of Clauses 13-17, wherein the different energy application parameters comprise a difference in one or more of the following: energy intensity, energy dosage, exposure time, energy wavelength, or energy type.

19. The method of any one of Clauses 13-18, wherein the different energy application parameters cause the at least two appliance portions to differ from each other with respect to one or more of the following: degree of curing of the curable material, crosslink density, phase, crystallinity, morphology, permeability, solubility, viscosity, swellability, reactivity, degradability, porosity, particle connectivity, surface area, or melting point.

20. The method of any one of Clauses 13-19, wherein the different material properties comprise a difference in one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.

21. A method comprising:
    receiving a dental appliance formed using an additive manufacturing process, the dental appliance including a plurality of appliance portions;
    identifying, based on sensor data, a location of a subset of the appliance portions on the dental appliance; and
    applying energy to a subset of the appliance portions to selectively modify one or more material properties of the subset of the appliance portions.

22. The method of Clause 21, wherein the dental appliance is received in a partially-cured state, and the energy is configured to increase a degree of curing of the subset of the appliance portions.

23. The method of Clause 21, wherein the dental appliance is received in a partially-cured state, and the energy is configured to decrease a degree of curing of the subset of the appliance portions.

24. The method of Clause 21, wherein the dental appliance is received in a post-cured state.

25. The method of any one of Clauses 21-24, wherein applying the energy to the subset of the appliance portions causes a change in one or more of the following in the subset of the appliance portions: degree of curing, crosslink density, phase, crystallinity, morphology, permeability, solubility, viscosity, swellability, reactivity, degradability, porosity, particle connectivity, surface area, or melting point.

26. The method of any one of Clauses 21-25, wherein the one or more material properties comprise one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.

27. The method of any one of Clauses 21-26, further comprising applying a second energy to the entirety of the dental appliance.

28. The method of Clause 27, wherein the second energy is different from the energy applied to the subset of the appliance portions.

29. The method of Clause 28, wherein the second energy differs from the energy with respect to one or more of the following: energy intensity, energy dosage, exposure time, energy wavelength, or energy type.

30. The method of any one of Clauses 21-29, wherein the dental appliance is a first dental appliance, and the method further comprises:
    receiving a second dental appliance formed using the additive manufacturing process, the second dental appliance including a plurality of second appliance portions, wherein the second dental appliance has a different geometry than the first dental appliance;
    identifying, based on sensor data, a location of a subset of the second appliance portions on the second dental appliance; and
    applying the energy to a subset of the second appliance portions so as to selectively modify one or more material properties of the subset of the second appliance portions.

31. A system for manufacturing a dental appliance, the system comprising:
    at least one sensor;
    at least one energy source configured to output energy;
    a processor; and
    a memory operably coupled to the processor and storing instructions that, when executed by the processor, cause the system to perform operations comprising:
        receiving, from the at least one sensor, sensor data of an additively manufactured dental appliance having a plurality of appliance portions,
        determining, based on the sensor data, a location of a subset of the appliance portions on the additively manufactured dental appliance, and
        applying the energy from the at least one energy source to a subset of the appliance portions so as to selectively modify one or more material properties of the subset of the appliance portions.

32. The system of Clause 31, wherein the at least one sensor comprises an imaging device.

33. The system of Clause 31 or 32, wherein the at least one energy source is movable to a plurality of different poses.

34. The system of any one of Clauses 31-33, wherein the at least one energy source comprises a plurality of energy sources configured to output energy along different directions.

35. The system of any one of Clauses 31-34, wherein the additively manufactured dental appliance is received in a partially-cured state, and the energy is configured to increase or decrease a degree of curing of the subset of the appliance portions.

36. The system of any one of Clauses 31-35, wherein applying the energy to the subset of the appliance portions causes a change in one or more of the following in the subset of the appliance portions: degree of curing, crosslink density, phase, crystallinity, morphology, permeability, solubility, viscosity, swellability, reactivity, degradability, porosity, particle connectivity, surface area, or melting point.

37. The system of any one of Clauses 31-36, wherein the one or more material properties comprise one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.

38. The system of any one of Clauses 31-37, further comprising at least one second energy source configured to output second energy, wherein the operations further comprise applying the second energy to the entirety of the additively manufactured dental appliance.

39. The system of any one of Clauses 31-38, further comprising at least one second sensor configured to detect an identifier associated with the additively manufactured dental appliance.
40. The system of Clause 39, wherein the operations further comprise:
    retrieving, based on the identifier, a digital data set representing a target distribution of material properties for the additively manufactured dental appliance, and
    determining the location of the subset of the appliance portions on the additively manufactured dental appliance based on the target distribution.
41. A method comprising:
    receiving a digital data set representing an object;
    applying energy to a curable material based on the digital data set to form the object,
        wherein the object includes at least two object portions formed from the curable material using different energy application parameters; and
    removing residual curable material from the object,
        wherein a different amount of the residual curable material is removed from each of the at least two object portions, and
        wherein, after the residual curable material is removed, the at least two object portions each have different material properties, and the at least two object portions each have (1) a glass transition temperature of at least 80° C. and/or (2) a modulus of at least 200 MPa.
42. The method of Clause 41, wherein the curable material comprises a resin.
43. The method of Clause 41 or 42, wherein the curable material is provided in a liquid or semi-liquid state, and applying the energy to the curable material causes the curable material to transform into a solid or semi-solid state.
44. The method of any one of Clauses 41-43, wherein the curable material comprises a plurality of low molecular weight components that react to form a higher molecular weight component when the energy is applied.
45. The method of any one of Clauses 41-44, wherein the object is formed from a single type of curable material.
46. The method of any one of Clauses 41-45, wherein the energy is applied to the curable material according to an additive manufacturing process.
47. The method of Clause 46, wherein the digital data set comprises instructions for fabricating the object via the additive manufacturing process.
48. The method of Clause 46 or 47, wherein the additive manufacturing process comprises a vat polymerization process.
49. The method of any one of Clauses 41-48, wherein the digital data set comprises instructions for applying the energy to the curable material with the different energy application parameters.
50. The method of Clause 49, wherein the instructions for applying the energy to the curable material comprise:
    a plurality of coordinates, each coordinate representing a location in the object, and
    a plurality of grayscale values, each grayscale value associated with a corresponding coordinate and representing an energy application parameter for the corresponding location in the object.
51. The method of any one of Clauses 41-50, wherein the energy comprises one or more of the following: electromagnetic energy, acoustic energy, or radiation energy.
52. The method of any one of Clauses 41-51, wherein the at least two object portions include a first object portion and a second object portion, and the different energy application parameters are selected to enhance removal of the residual curable material from the first object portion compared to the second object portion.
53. The method of any one of Clauses 41-51 wherein the at least two object portions include a first object portion and a second object portion, and the different energy application parameters are selected to reduce removal of the residual curable material from the first object portion compared to the second object portion.
54. The method of any one of Clauses 41-53, wherein the different energy application parameters comprise a difference in one or more of the following: energy intensity, energy dosage, exposure time, energy wavelength, or energy type.
55. The method of any one of Clauses 41-54, wherein the different energy application parameters cause the at least two object portions to differ from each other with respect to one or more of the following: degree of curing of the curable material, crosslink density, phase, crystallinity, morphology, permeability, solubility, viscosity, swellability, reactivity, degradability, porosity, particle connectivity, surface area, or melting point.
56. The method of any one of Clauses 41-55, wherein the different material properties of the at least two object portions result from the different amounts of the residual curable material removed from each of the at least two object portions.
57. The method of any one of Clauses 41-56, wherein the different material properties comprise a difference in one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.
58. The method of any one of Clauses 41-57, wherein removing the residual curable material from the object comprises one or more of the following: exposing the object to a solvent, applying heat to the object, or applying a vacuum to the object.
59. The method of any one of Clauses 41-58, wherein a geometry of the object before the residual curable material is removed is substantially the same as a geometry of the object after the residual curable material is removed.
60. The method of any one of Clauses 41-59, wherein applying the energy to the curable material to form the object comprises:
    forming a first object portion using a first set of energy application parameters, and
    forming a second object portion using a second set of energy application parameters different from the first set of energy application parameters.
61. The method of Clause 60, wherein the first and second object portions are symmetrically arranged such that the object exhibits substantially no deformation after the residual curable material is removed.

62. The method of any one of Clauses 41-61, further comprising post-curing the object after the residual curable material has been removed.
63. The method of Clause 62, wherein, after post-curing, the at least two object portions each exhibit one or more of the following: a glass transition temperature of at least 80° C., an elongation to break of at least 50% at 1.7 mm/min, or a modulus of at least 200 MPa.
64. The method of Clause 62 or 63, wherein, after post-curing, the entirety of the object exhibits one or more of the following: a glass transition temperature of at least 80° C., an elongation to break of at least 50% at 1.7 mm/min, or a modulus of at least 200 MPa.
65. The method of any one of Clauses 41-64, wherein the object comprises a dental appliance.
66. A method, comprising:
 receiving a digital data set representing an object;
 applying energy to a curable material based on the digital data set to form the object,
  wherein the object includes at least two object portions formed using different energy application parameters; and
 removing residual curable material from the object by exposing the object to a solvent,
  wherein the solvent is selected to infiltrate differently into the at least two object portions such that a different amount of the residual curable material is removed from each of the at least two object portions, and
  wherein, after the residual curable material is removed, the at least two object portions each have different material properties.
67. The method of Clause 66, wherein the curable material comprises a resin.
68. The method of Clause 66 or 67, wherein the curable material is provided in a liquid or semi-liquid state, and applying the energy to the curable material causes the curable material to transform into a solid or semi-solid state.
69. The method of any one of Clauses 66-68, wherein the curable material comprises a plurality of low molecular weight components that react to form a higher molecular weight component when the energy is applied.
70. The method of any one of Clauses 66-69, wherein the object is formed from a single type of curable material.
71. The method of any one of Clauses 66-70, wherein the energy is applied to the curable material according to an additive manufacturing process.
72. The method of Clause 71, wherein the digital data set comprises instructions for fabricating the curable material via the additive manufacturing process.
73. The method of Clause 71 or 72, wherein the additive manufacturing process comprises a vat polymerization process.
74. The method of any one of Clauses 66-73, wherein the digital data set comprises instructions for applying the energy to the curable material with the different energy application parameters.
75. The method of Clause 74, wherein the instructions for applying the energy to the curable material comprise:
 a plurality of coordinates, each coordinate representing a location in the object, and
 a plurality of grayscale values, each grayscale value associated with a corresponding coordinate and representing an energy application parameter for the corresponding location in the object.
76. The method of any one of Clauses 66-75, wherein the energy comprises one or more of the following: electromagnetic energy, acoustic energy, or radiation energy.
77. The method of any one of Clauses 66-76, wherein the at least two object portions include a first object portion and a second object portion, and the different energy application parameters are selected to enhance infiltration of the solvent into the first object portion compared to the second object portion.
78. The method of any one of Clauses 66-77, wherein the at least two object portions include a first object portion and a second object portion, and the different energy application parameters are selected to reduce infiltration of the solvent into from the first object portion compared to the second object portion.
79. The method of any one of Clauses 66-78, wherein the solvent comprises one or more of acetic acid, acetone, acetonitrile, ammonia, benzene, butanol, butyl acetate, camphor, carbon tetrachloride, chloroform, cyclohexanone, diethyl ether, dimethylformamide, dimethylsulfoxide, dioxane, ethanol, ethyl acetate, ethyl cellosolve, ethyl lactate, ethylene glycols, eugenol, glycerin, heptanes, hexanes, isoamyl acetate, isopropyl acetate, isopropyl alcohol, liquid or low melting sugars, low melting or high melting waxes, menthol, methanol, methylene chloride, phenols, propanol, propylene carbonate, propylene glycols, pressurized gases, silicone oils (e.g., aliphatic and/or aromatic), soapy water, supercritical carbon dioxide, tetrahydrofuran, toluene, triacetin, turpentine, vanillin, vegetable oils, water, xylene.
80. The method of any one of Clauses 66-79, wherein the different energy application parameters comprise a difference in one or more of the following: energy intensity, energy dosage, exposure time, energy wavelength, or energy type.
81. The method of any one of Clauses 66-80, wherein the different energy application parameters cause the at least two object portions to differ from each other with respect to one or more of the following: degree of curing of the curable material, crosslink density, phase, crystallinity, morphology, permeability, solubility, viscosity, swellability, reactivity, degradability, porosity, particle connectivity, surface area, or melting point.
82. The method of any one of Clauses 66-81, wherein the different material properties of the at least two object portions result from the different amounts of the residual curable material removed from each of the at least two object portions.
83. The method of any one of Clauses 66-82, wherein the different material properties comprise a difference in one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.
84. The method of any one of Clauses 66-83, wherein a geometry of the object before the residual curable material is removed is substantially the same as a geometry of the object after the residual curable material is removed.

85. The method of any one of Clauses 66-84, wherein applying the energy to the curable material to form the object comprises:
   forming a first object portion using a first set of energy application parameters, and
   forming a second object portion using a second set of energy application parameters different from the first set of energy application parameters.
86. The method of Clause 85, wherein the first and second object portions are symmetrically arranged such that the object exhibits substantially no deformation after the residual curable material is removed.
87. The method of any one of Clauses 66-86, further comprising post-processing the object after the residual curable material has been removed.
88. The method of Clause 87, wherein the post-processing comprises one or more of the following: post-curing the object, cleaning the object, polishing the object, or removing additional material from the object.
89. The method of any one of Clauses 66-88, wherein the object comprises a dental appliance.
90. A method, comprising:
   receiving an object formed using an additive manufacturing process, the object including a plurality of object portions;
   identifying, based on sensor data, a location of a subset of the object portions on the object; and
   applying energy to a subset of the object portions so as to selectively modify one or more material properties of the subset of the object portions.
91. The method of Clause 90, wherein the object is formed from a resin.
92. The method of Clause 90 or 91, wherein the object is formed from a single type of material.
93. The method of any one of Clauses 90-92, wherein the sensor data comprises image data of the object.
94. The method of any one of Clauses 90-93, wherein the energy comprises one or more of the following: electromagnetic energy, acoustic energy, or radiation energy.
95. The method of any one of Clauses 90-94, wherein the energy is applied by at least one movable energy source.
96. The method of any one of Clauses 90-95, wherein the energy is applied by a plurality of energy sources.
97. The method of any one of Clauses 90-96, wherein the object is received in a partially-cured state, and the energy is configured to increase a degree of curing of the subset of the object portions.
98. The method of any one of Clauses 90-96, wherein the object is received in a partially-cured state, and the energy is configured to decrease a degree of curing of the subset of the object portions.
99. The method of any one of Clauses 90-96, wherein the object is received in a post-cured state.
100. The method of any one of Clauses 90-99, wherein applying the energy to the subset of the object portions causes a change in one or more of the following in the subset of the object portions: degree of curing, crosslink density, phase, crystallinity, morphology, permeability, solubility, viscosity, swellability, reactivity, degradability, porosity, particle connectivity, surface area, or melting point.
101. The method of any one of Clauses 90-100, wherein the one or more material properties comprise one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.
102. The method of any one of Clauses 90-101, further comprising applying a second energy to the entirety of the object.
103. The method of Clause 102, wherein the second energy is different from the energy applied to the subset of the object portions.
104. The method of Clause 103, wherein the second energy differs from the energy with respect to one or more of the following: energy intensity, energy dosage, exposure time, energy wavelength, or energy type.
105. The method of any one of Clauses 90-104, wherein the object comprises a dental appliance.
106. The method of Clause 105, wherein the dental appliance is a palatal expander having a teeth engaging portion and an expander portion, and the energy is applied to either the teeth engaging portion or the expander portion.
107. The method of Clause 106, wherein selectively applying the energy causes the expander portion to have a higher strength than the teeth engaging portion.
108. The method of any one of Clauses 90-107, wherein the object comprises a functional component coupled to one or more supports, and the energy is applied to either the functional component or the one or more supports.
109. The method of Clause 108, wherein applying the energy causes the functional component to have a higher strength than the one or more supports.
110. The method of any one of Clauses 90-109, further comprising determining a target distribution of material properties for the object, wherein the location of the subset of the object portions corresponds to the target distribution.
111. The method of Clause 110, further comprising:
   receiving an identifier for the object, and
   retrieving, based on the identifier, a digital data set representing the target distribution of material properties for the object.
112. The method of Clause 111, wherein the identifier is received from a tag associated with the object.
113. The method of any one of Clauses 90-112, wherein the object is a first object, and the method further comprises:
   receiving a second object formed using the additive manufacturing process, the second object including a plurality of second object portions, wherein the second object has a different geometry than the first object;
   identifying, based on sensor data, a location of a subset of the second object portions on the second object; and
   applying the energy to a subset of the second object portions so as to selectively modify one or more material properties of the subset of the second object portions.
114. A system for manufacturing an object, the system comprising:
   at least one sensor;
   at least one energy source configured to output energy;
   a processor; and a memory operably coupled to the processor and storing instructions that, when executed by the processor, cause the system to perform operations comprising:
receiving, from the at least one sensor, sensor data of an additively manufactured object having a plurality of object portions,
determining, based on the sensor data, a location of a subset of the object portions on the additively manufactured object, and
applying the energy from the at least one energy source to a subset of the object portions so as to selectively modify one or more material properties of the subset of the object portions.

115. The system of Clause 114, further comprising an additive manufacturing apparatus configured to form the additively manufactured object from a curable material.

116. The system of Clause 115, wherein the additive manufacturing apparatus is configured to form the additively manufactured object from a single type of curable material.

117. The system of any one of Clauses 114-116, wherein the at least one sensor comprises an imaging device.

118. The system of any one of Clauses 114-117, wherein the at least one energy source is configured to output one or more of the following: electromagnetic energy, acoustic energy, or radiation energy.

119. The system of any one of Clauses 114-118, wherein the at least one energy source is movable to a plurality of different poses.

120. The system of Clause 119, wherein the operations further comprise:
determining a pose of the at least one energy source such that the energy output by the at least one energy source targets the subset of the object portions, and
moving the at least one energy source into the pose.

121. The system of Clause 119 or 120, wherein the at least one energy source is coupled to a robotic arm.

122. The system of any one of Clauses 114-121, wherein the at least one energy source comprises a plurality of energy sources configured to output energy along different directions.

123. The system of Clause 122, wherein the operations further comprise:
identifying one or more of the energy sources that output energy toward the subset of the object portions, and
activating the one or more energy sources to apply the energy to the subset of the object portions.

124. The system of any one of Clauses 114-123, wherein the additively manufactured object is received in a partially-cured state, and the energy is configured to increase a degree of curing of the subset of the object portions.

125. The system of any one of Clauses 114-123, wherein the additively manufactured object is received in a partially-cured state, and the energy is configured to decrease a degree of curing of the subset of the object portions.

126. The system of any one of Clauses 114-123, wherein the additively manufactured object is received in a post-cured state.

127. The system of any one of Clauses 114-126, wherein applying the energy to the subset of the object portions causes a change in one or more of the following in the subset of the object portions: degree of curing, cross-link density, phase, crystallinity, morphology, permeability, solubility, viscosity, swellability, reactivity, degradability, porosity, particle connectivity, surface area, or melting point.

128. The system of any one of Clauses 114-127, wherein the one or more material properties comprise one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.

129. The system of any one of Clauses 114-128, further comprising at least one second energy source configured to output second energy, wherein the operations further comprise applying the second energy to the entirety of the additively manufactured object.

130. The system of any one of Clauses 114-129, further comprising at least one second sensor configured to detect an identifier associated with the additively manufactured object.

131. The system of Clause 130, wherein the operations further comprise:
retrieving, based on the identifier, a digital data set representing a target distribution of material properties for the additively manufactured object, and
determining the location of the subset of the object portions on the additively manufactured object based on the target distribution.

132. The system of any one of Clauses 114-131, further comprising a conveyer belt configured to transport the additively manufactured object from a first location near the at least one sensor to a second location near the at least one energy source.

133. A non-transitory computer-readable storage medium comprising instructions that, when executed by one or more processors of a computing system, cause the computing system to perform operations comprising:
receiving sensor data of an additively manufactured object having a plurality of object portions;
determining, based on the sensor data, a location of a subset of the object portions on the additively manufactured object; and
applying energy to a subset of the object portions so as to selectively modify one or more material properties of the subset of the object portions.

CONCLUSION

Although many of the embodiments are described above with respect to systems, devices, and methods for manufacturing dental appliances, the technology is applicable to other applications and/or other approaches, such as drug delivery, molecular detection, and manufacturing of other types of objects with spatially controlled properties (e.g., objects including crumple zones, hinges, reinforced regions, etc.). Moreover, other embodiments in addition to those described herein are within the scope of the technology. For example, although certain embodiments of the methods herein are described with respect to objects formed from curable materials, this is not intended to be limiting, and the present technology can also be applied to objects formed using other types of precursor materials, such as materials that are formed into a 3D object via sintering, melting, laminating, etc. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-12C.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for post-processing an additively manufactured dental appliance, the method comprising:
   receiving the additively manufactured dental appliance from an additive manufacturing system, the additively manufactured dental appliance including a plurality of appliance portions;
   identifying, based on sensor data, a location of a subset of the appliance portions on the additively manufactured dental appliance; and
   applying energy to the subset of the appliance portions to selectively modify one or more material properties of the subset of the appliance portions.

2. The method of claim 1, wherein the additively manufactured dental appliance is received in a partially-cured state, and the energy is configured to increase a degree of curing of the subset of the appliance portions.

3. The method of claim 1, wherein the additively manufactured dental appliance is received in a partially-cured state, and the energy is configured to decrease a degree of curing of the subset of the appliance portions.

4. The method of claim 1, wherein the additively manufactured dental appliance is received in a post-cured state.

5. The method of claim 1, wherein applying the energy to the subset of the appliance portions causes a change in one or more of the following in the subset of the appliance portions: degree of curing, crosslink density, phase, crystallinity, morphology, permeability, solubility, viscosity, swellability, reactivity, degradability, porosity, particle connectivity, surface area, or melting point.

6. The method of claim 1, wherein the one or more material properties comprise one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.

7. The method of claim 1, further comprising applying a second energy to the entirety of the additively manufactured dental appliance.

8. The method of claim 7, wherein the second energy is different from the energy applied to the subset of the appliance portions.

9. The method of claim 8, wherein the second energy differs from the energy with respect to one or more of the following: energy intensity, energy dosage, exposure time, energy wavelength, or energy type.

10. The method of claim 1, wherein the additively manufactured dental appliance is a first additively manufactured dental appliance, and the method further comprises:
    receiving a second additively manufactured dental appliance from the additive manufacturing system, the second additively manufactured dental appliance including a plurality of second appliance portions, wherein the second additively manufactured dental appliance has a different geometry than the first additively manufactured dental appliance;

identifying, based on sensor data, a location of a subset of the second appliance portions on the second additively manufactured dental appliance; and applying the energy to a subset of the second appliance portions so as to selectively modify one or more material properties of the subset of the second appliance portions.

11. A method for post-processing a dental appliance, the method comprising:

receiving the dental appliance after the dental appliance has been fabricated via an additive manufacturing process, the dental appliance including a plurality of appliance portions;

identifying, based on sensor data, a location of a subset of the appliance portions on the dental appliance; and applying energy to the subset of the appliance portions to selectively modify one or more material properties of the subset of the appliance portions.

12. The method of claim 11, wherein the dental appliance is received in a partially-cured state, and the energy is configured to increase a degree of curing of the subset of the appliance portions.

13. The method of claim 11, wherein the dental appliance is received in a partially-cured state, and the energy is configured to decrease a degree of curing of the subset of the appliance portions.

14. The method of claim 11, wherein the dental appliance is received in a post-cured state.

15. The method of claim 11, wherein applying the energy to the subset of the appliance portions causes a change in one or more of the following in the subset of the appliance portions: degree of curing, crosslink density, phase, crystallinity, morphology, permeability, solubility, viscosity, swellability, reactivity, degradability, porosity, particle connectivity, surface area, or melting point.

16. The method of claim 11, wherein the one or more material properties comprise one or more of the following: modulus, glass transition temperature, elongation to break, elongation to yield, strength, solubility, hardness, scratch resistance, roughness, degradability, color, refractive index, energy absorption, energy dissipation, energy reflection, energy scatter, transparency, diffusion, pH, porosity, morphology, chemical composition, molecular recognition, molecular absorption, molecular release, phase separation, morphology, or durability.

17. The method of claim 11, further comprising applying a second energy to the entirety of the dental appliance.

18. The method of claim 17, wherein the second energy is different from the energy applied to the subset of the appliance portions.

19. The method of claim 18, wherein the second energy differs from the energy with respect to one or more of the following: energy intensity, energy dosage, exposure time, energy wavelength, or energy type.

20. The method of claim 11, wherein the dental appliance is a first dental appliance, and the method further comprises:

receiving a second dental appliance after the second dental appliance has been fabricated via the additive manufacturing process, the second dental appliance including a plurality of second appliance portions, wherein the second dental appliance has a different geometry than the first dental appliance;

identifying, based on sensor data, a location of a subset of the second appliance portions on the second dental appliance; and applying the energy to a subset of the second appliance portions so as to selectively modify one or more material properties of the subset of the second appliance portions.

* * * * *